US008956078B2

(12) United States Patent
Roodenburg et al.

(10) Patent No.: US 8,956,078 B2
(45) Date of Patent: Feb. 17, 2015

(54) REEL LAY SYSTEM

(71) Applicant: ITREC B.V., Schiedam (NL)

(72) Inventors: Joop Roodenburg, Delft (NL); Terence Willem August Vehmeijer, The Hague (NL); Wouter Johannes Slob, The Hague (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/105,340

(22) Filed: Dec. 13, 2013

(65) Prior Publication Data

US 2014/0147213 A1 May 29, 2014

Related U.S. Application Data

(62) Division of application No. 13/580,983, filed as application No. PCT/NL2010/050891 on Dec. 28, 2010.

(30) Foreign Application Priority Data

Feb. 25, 2010 (NL) ..................................... 2004304
Jul. 5, 2010 (NL) ..................................... 2005025

(51) Int. Cl.
*F16L 1/20* (2006.01)
*B63B 35/03* (2006.01)
*F16L 1/19* (2006.01)

(52) U.S. Cl.
CPC ................. *F16L 1/207* (2013.01); *B63B 35/03* (2013.01); *F16L 1/19* (2013.01); *F16L 1/203* (2013.01)
USPC ...................................... 405/168.3; 405/166

(58) Field of Classification Search
USPC ............................. 405/158, 166, 168.1, 168.3
See application file for complete search history.

(56) References Cited

U.S. PATENT DOCUMENTS

| 3,685,306 A | * | 8/1972 | Mott | 405/168.3 |
| 4,340,322 A | * | 7/1982 | Springett et al. | 405/168.3 |
| 4,594,871 A | * | 6/1986 | de Boer | 405/168.3 |
| 4,913,080 A | * | 4/1990 | Kindem et al. | 114/250 |
| 4,984,934 A | * | 1/1991 | Recalde | 405/168.3 |
| 5,533,834 A | * | 7/1996 | Recalde | 405/168.3 |
| 6,056,478 A | | 5/2000 | Martin et al. | |

(Continued)

FOREIGN PATENT DOCUMENTS

| EP | 0 262 545 A1 | 4/1988 |
| EP | 0 302 038 A1 | 2/1989 |

(Continued)

*Primary Examiner* — Benjamin Fiorello
(74) *Attorney, Agent, or Firm* — Birch, Stewart, Kolasch & Birch, LLP

(57) ABSTRACT

A method for reel-laying pipelines from a vessel includes reel laying a first pipeline by unwinding a first reel, and guiding the pipeline via a guide wheel through a tensioners and a hang off clamp into the sea; closing the hang off clamp to support the first pipeline; connecting an end portion of the first pipeline to a retaining system; replacing the first reel by a second reel; providing a temporary connection between an end portion of the second pipeline and the end portion of the first pipeline; disconnecting the first pipeline from the retaining system; opening the hang off clamp; continuing reel laying by unwinding the second reel; closing the hang off clamp; removing the temporary connection between the first and second pipeline; and connecting the first and second pipeline end to end between the tensioners and the hang off clamp.

11 Claims, 17 Drawing Sheets

(56) References Cited

U.S. PATENT DOCUMENTS

Figure 1:
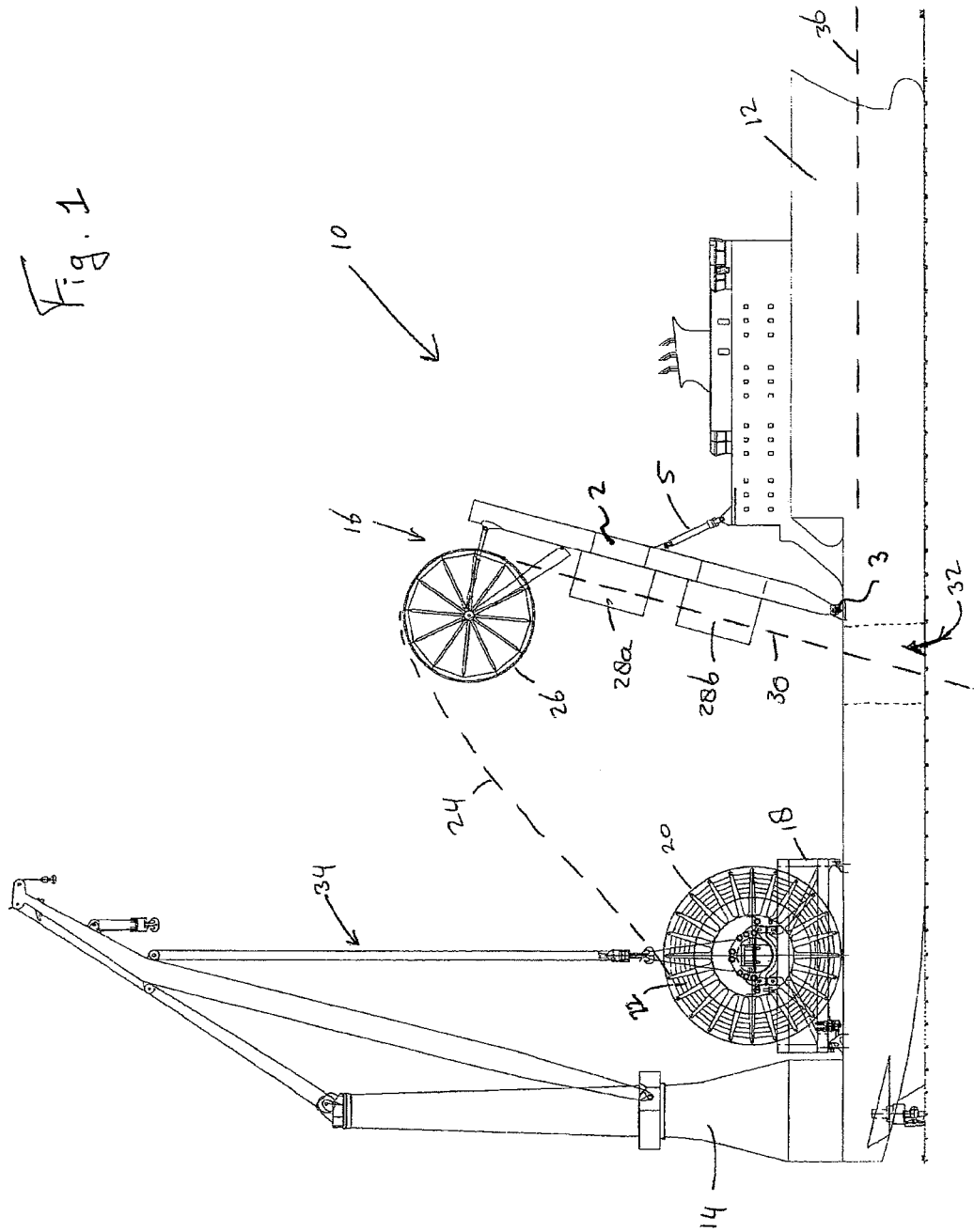

| | | | |
|---|---|---|---|
| 6,868,902 B1* | 3/2005 | Roodenburg et al. | 166/77.2 |
| 7,029,206 B2* | 4/2006 | Stockstill | 405/169 |
| 2003/0091395 A1 | 5/2003 | Stockstill | |
| 2008/0304912 A1* | 12/2008 | Roodenburg et al. | 405/168.3 |
| 2012/0148348 A1* | 6/2012 | Stockstill et al. | 405/170 |

FOREIGN PATENT DOCUMENTS

| | | |
|---|---|---|
| GB | 2 439 295 A | 12/2007 |
| WO | WO 2004/068012 A2 | 8/2004 |

* cited by examiner

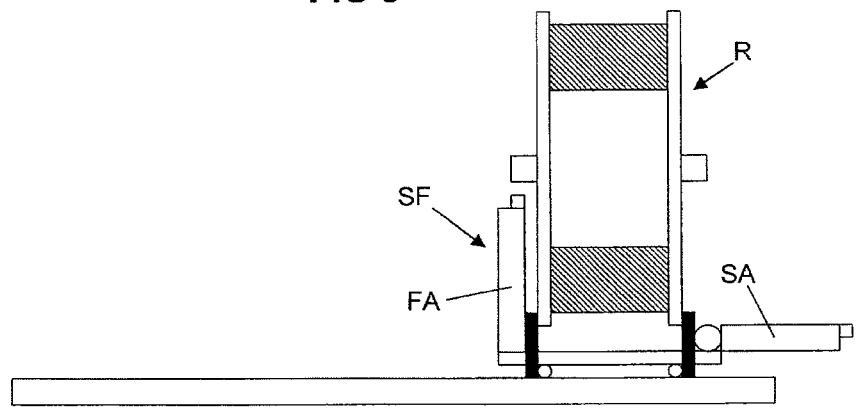
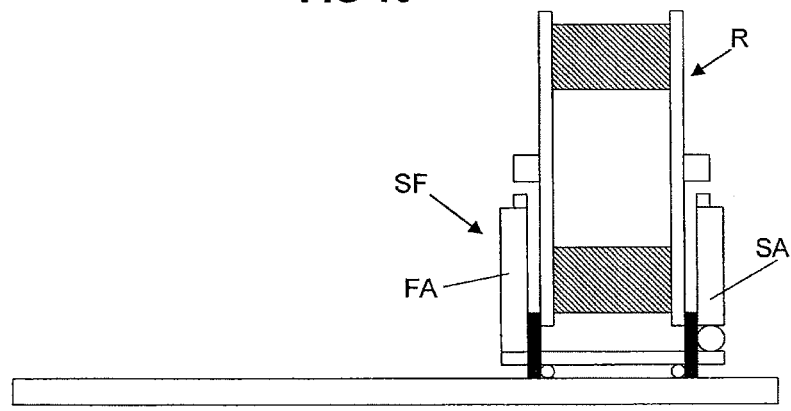
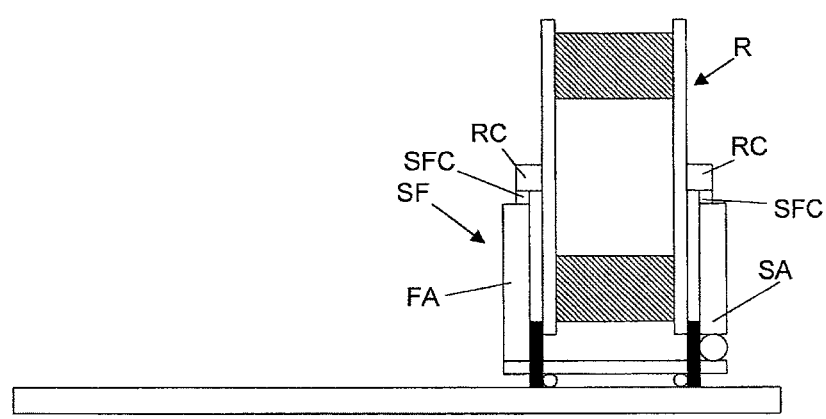

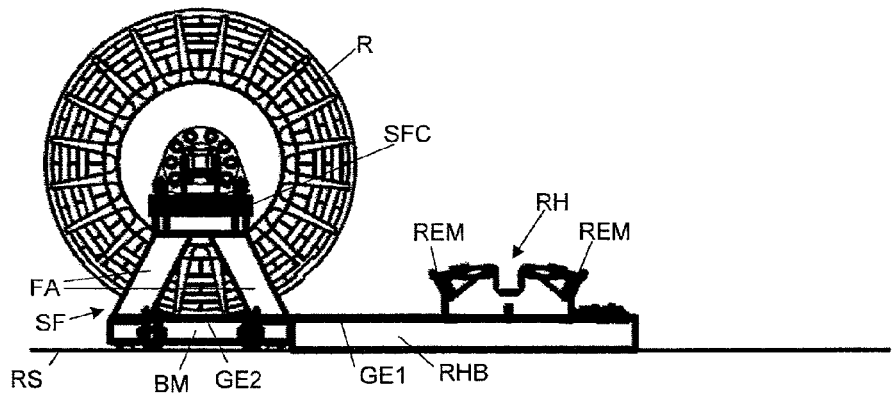
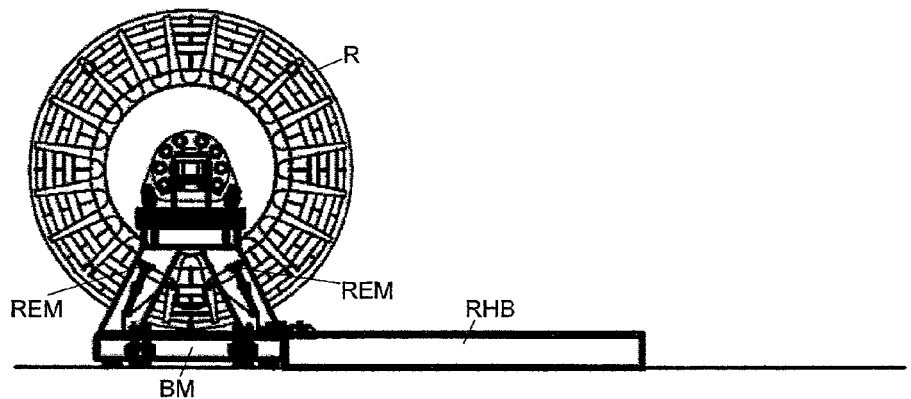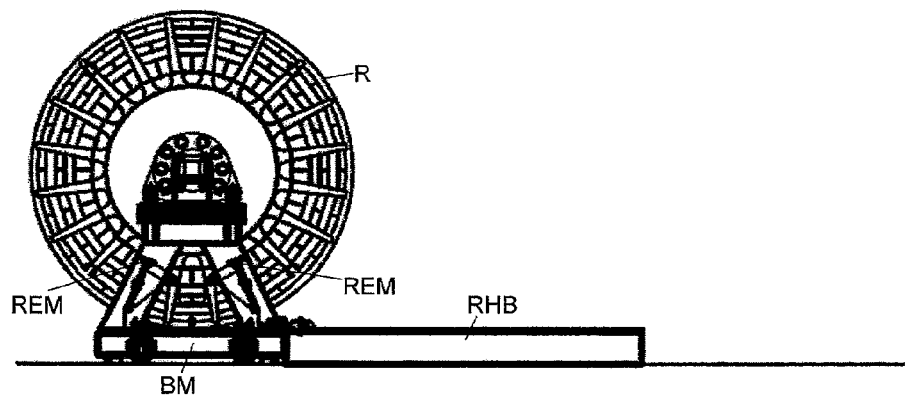

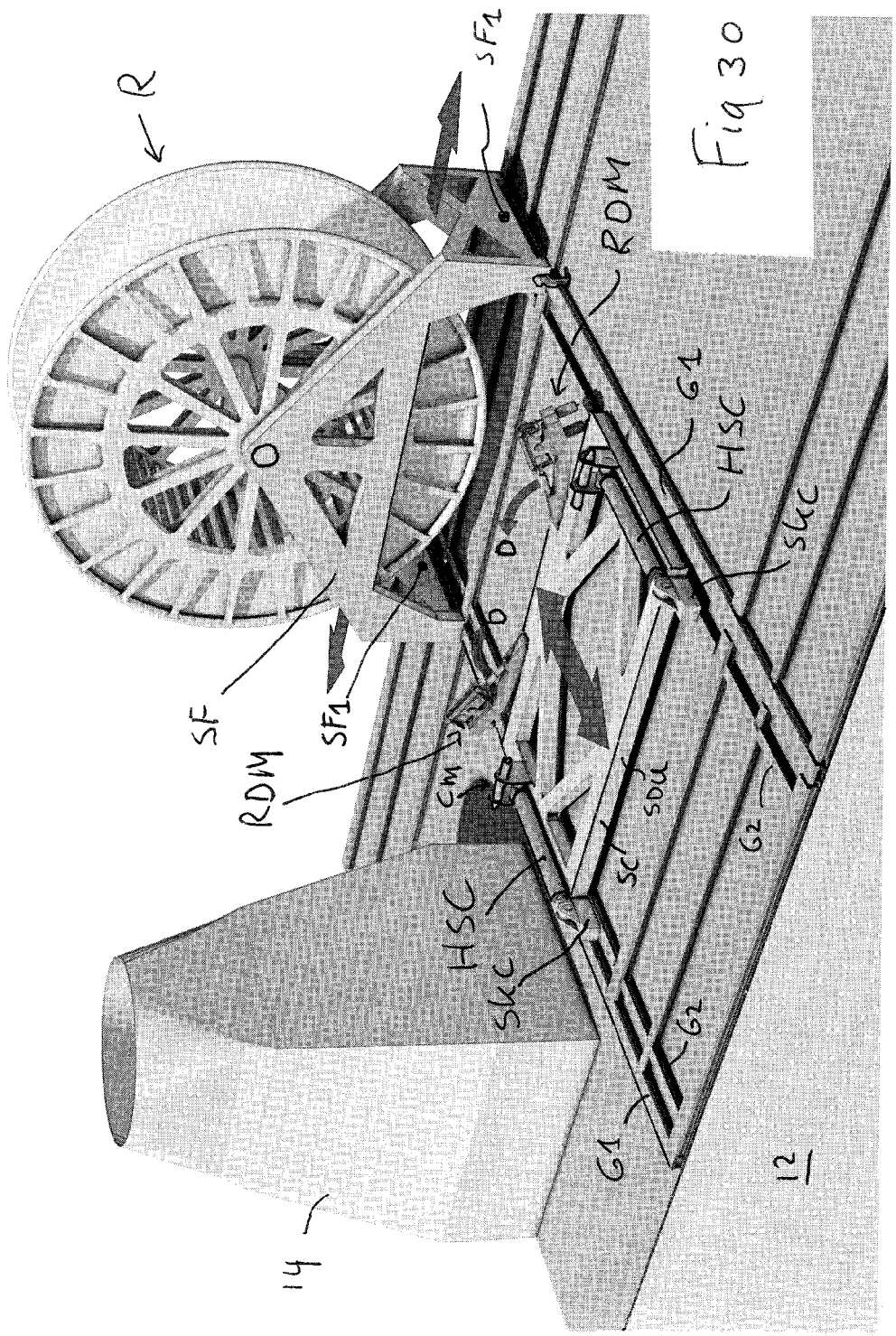

REEL LAY SYSTEM

CROSS-REFERENCES TO RELATED APPLICATIONS

This application is a Divisional of co-pending application Ser. No. 13/580,983, filed on Nov. 6, 2012, the entire contents of which are hereby incorporated by reference and for which priority is claimed under 35 U.S.C. §120. application Ser. No. 13/580,983 is the National Phase of PCT International Application No. PCT/NL2010/050891 filed on Dec. 28, 2010 under 35 U.S.C. §371 and which claims priority to Application Nos. 2004304 and 2005025 filed in The Netherlands on Feb. 25, 2010 and Jul. 5, 2010, respectively The entire contents of each of the above-identified applications are hereby incorporated by reference.

The invention relates to continuously laying a pipeline on a floor of a body of water using a pipelaying system.

Such pipelaying systems have been build by the applicant for many years now and usually include a pipelaying vessel. The pipelaying vessel has a floating body and arranged on the floating body a permanent vertical reel for storing the pipeline to be laid and a guide, e.g. a guide wheel, for guiding the pipeline to be laid into the body of water towards the floor of the body of water.

When the reel is empty, the pipelaying vessel is usually moved to an onshore assembly and winding site, which comprises an assembly line with at least one working station to join pipe sections end to end. After assembly of the pipeline to be laid, said pipeline is spooled, i.e. winded, onto the permanent reel of the pipelaying vessel. After completely filling the reel, the pipelaying vessel can return to continue the pipelaying process.

A reel for pipeline easily weighs about 700 metric tons and depending on the pipe diameter can store several kilometers of pipeline. For instance using a 25 meter diameter reel, the reel is able to store 7.5 km of pipeline with a pipe diameter of 16 inches or 80 km of pipeline with a pipe diameter of 4 inches. In total, a filled reel, i.e. a reel including pipeline to be laid, may weigh up to 2500 to 3000 metric tons.

A drawback of the current reel pipelaying systems is that pipelaying is a time-consuming and inefficient process.

It is therefore an object of the invention to provide an improved reel pipelaying system, in particular a pipelaying system which is more efficient, preferably less time-consuming.

This object is achieved by providing a system for continuously laying a pipeline on a floor of a body of water, wherein said system comprises:
- at least one interchangeable reel for storing the pipeline to be laid;
- a pipelaying vessel configured to receive and support said reel, and to lay the pipeline from said reel into the body of water;
- an assembly and winding site configured to assemble the pipeline to be laid, to receive and support said reel, and to wind said pipeline on said reel; and
- a crane to transfer the interchangeable reel from and to the pipelaying vessel.

By providing the interchangeable reel, there is no longer a need to spool the pipeline directly from the assembly and winding site onto the reel permanently arranged on board of the pipelaying vessel. Therefore, the assembly and winding site can be designed simpler. Further, the reel can easily be filled at a separate location remote from the pipelaying vessel, which is especially advantageous when the assembly and winding site is located on shore.

It is envisaged that an interchangeable reel filled with pipe may weigh at least 1000 metric tons, e.g. between 2000-3500 metric tons.

Another advantage may be that the time to provide a filled reel to the pipelaying vessel can be reduced. This is achieved by pre-filling an empty reel at the assembly and winding site and interchanging the pre-filled reel with an empty reel on the pipelaying vessel.

The system may be used to perform the following steps to continuously lay a pipeline on the floor of a body of water:
a) providing a filled interchangeable reel by assembling the pipeline to be laid by joining pipe sections end to end, and winding the pipeline to be laid on said reel at the assembly and winding site remote from the pipelaying vessel;
b) transferring the filled reel from the assembly and winding site to the pipelaying vessel;
c) laying the pipeline from the pipelaying vessel into the body of water by unwinding said reel and guiding the pipeline towards the floor of the body of water until said reel is empty;
d) transferring the empty reel from the pipelaying vessel to the assembly and winding site.

The above steps a)-d) may be repeated until the entire pipeline is laid. The method is particularly suitable for rigid pipe.

After transferring the reel to the pipelaying vessel, said reel can either be stationary supported by a deck of the vessel, or it can be moveably supported by the deck of the vessel, such that it can move in a horizontal direction over the deck.

Preferably, the reel is vertically supported by a support frame.

In case the reel is stationary supported by the vessel, the interchangeable reel preferably comprises reel drive means to rotate at least a part of the reel. Said reel drive means are thus permanently mounted to said reel and are interchanged together with said reel. An advantage is that the coupling between the reel drive means and the rotatable part of the reel is not affected by the interchanging of the reel and no alignment process is required during or after interchanging of said reel. The support frame of the reel may also be permanently mounted to the reel, so that the support frame is also interchanged together with the reel. However, it is also envisaged that the support frame is not interchanged with the reel, in which case, both the pipelaying vessel and the assembly and winding site are provided with respective support frames having frame couplers to releasably couple with respective reel couplers on the reel.

In case the reel is moveably supported by the vessel, the support frame is preferably skiddable along the deck. To skid the support frame along the deck, a skid drive unit may be provided. The skid drive unit may be integrated with the support frame in which case the support frame is preferably not interchanged together with the reel, but stays behind on the vessel to receive respective reels, because the skid drive unit adds a significant amount of weight to the support frame which makes moving the support frame less favourable. Another advantage of not interchanging the skid drive unit is that power and communication connections between skid drive unit may have a permanent character and do not have to be disconnected and subsequently reconnected which would be the case if the skid drive unit would be interchanged along with the reel. When the support frame is not interchanged together with the reel, the support frame and the interchangeable reel are preferably provided with support frame couplers and reel couplers respectively which couple with each other to couple the reel to the support frame.

The skid drive unit may also be provided separate from the support frame, thereby allowing the support frame to be interchanged together with the reel, the skid drive unit remaining on the vessel. The reel drive means, which are configured to rotate at least a part of the reel for unwinding of the pipeline, may be permanently mounted to the reel and/or support frame depending on what is interchanged or not, but may also be provided separate from the support frame and the reel. In an embodiment, the skid drive unit and the reel drive means may be combined into a single unit.

When the support frame is not interchanged with the reel, transferring of the interchangeable reel comprises the steps:
uncoupling the reel from a support frame;
moving the reel to another support frame;
coupling the reel to said other support frame.

Coupling may be done via a pin-hole assembly, a lock, bolting, clamping, etc.

In an embodiment, the interchangeable reel comprises an axle body defining a rotation axis, preferably a horizontal rotation axis, and a cylindrical reel body to rotate relative to the axle body about said rotation axis, wherein in case of reel couplers, said reel couplers are arranged on the axle body. This provides for an easier coupling between reel and support frame if they are not interchanged together, as the orientation of the reel body is no longer important for the coupling action between the axle body and the support frame.

The reel drive means are preferably arranged between the axle body and the reel body, so that no alignment between the support frame and the reel is required to drive the reel. In an embodiment, the reel drive means comprise at least one actuator, e.g. a gear, arranged on the axle body and a reaction element, e.g. a rack, arranged on the reel body to cooperate with said actuator.

In an embodiment, the reel body comprises sidewalls or flanges on each side of the reel body seen in axial direction of the reel body. This delimits an area of the reel in which the pipeline to be laid can be spooled.

In an embodiment, the assembly and winding site is located on a floating body of a supply vessel. This increases the flexibility of the system. No onshore assembly and winding site needs to be build close to the pipelaying site, as the supply vessel with assembly and winding site is mobile by its nature. It is now even possible to move the supply vessel close to the pipelaying vessel in order to interchange reels. It will be understood by the person skilled in the art of reel lay pipelaying that this decreases the amount of time necessary to obtain a filled reel dramatically compared to the prior art systems.

The assembly and winding site preferably comprises an assembly line with at least one working station to join pipe sections end to end. Depending on what is interchanged or not, the assembly and winding site may have a permanent support frame to receive a reel, or the support frame is interchanged together with the reel in which case the assembly and winding site allows the receiving of the reel including support frame.

The support frame and the assembly line are preferably arranged in line with each other to make it easier to wind the pipeline directly on the reel from the assembly line.

In an embodiment, the support frame supporting the reel on the assembly and winding site is moveable with respect to the assembly line in a horizontal direction perpendicular to a longitudinal axis of the assembly line. To move the support frame, a skid drive unit may be provided which depending on the interchangeability of the support frame is arranged on the support frame or separate from the support frame. The moveability of the support frame relative to the assembly line reduces the stresses in the pipeline and corresponding equipment as the pipeline spooled on the reel can be aligned with the assembly line, i.e. the last piece of the pipeline wound on the reel can be aligned with the assembly line. It also allows a better control of how the pipeline is spooled onto the reel.

The assembly line may be moveable relative to the reel in a direction parallel to the rotation axis of the reel, so that three situations are possible: (1) the support frame including reel is moveable and the assembly line is stationary as described above, (2) the support frame including reel is stationary and the assembly line is moveable, or (3) both the support frame including reel and the assembly line are moveable.

In an embodiment, the assembly line comprises a frame and guidance members for supporting and guiding pipe sections, wherein the at least one working station and the guidance members are arranged on the frame. This allows for easy alignment between reel or support frame and the assembly line as moving the frame moves the entire assembly line.

In an embodiment, the assembly line comprises a tensioner at an end of the assembly line that is closest to the support frame to apply tension to the pipeline that is wound on said reel. This allows to tightly wind the pipeline around the reel. In case of rigid pipe, the pipeline has to be wound around the reel by plastic deformation of the pipeline, which requires the application of appropriate forces to the pipeline. The tensioner, preferably in combination with reel drive means driving the rotation of the reel, are able to apply such forces. Preferably, the tensioner is provided on the frame of the assembly line to be moved along with said frame and thus along with the pipeline to be spooled onto the reel.

In an embodiment, the assembly and winding site comprises multiple assembly lines, such that multiple reels can be filled at the same time. This makes the system more versatile.

In an embodiment, the assembly and winding site comprises a pipe section storage for storing pipe sections to be joined. Especially when the assembly and winding site is located on a supply vessel, there will be a need to assemble the pipeline in a certain time frame, which can be done when the pipe sections are readily available.

In an embodiment, the pipe section storage is located on another deck of the floating body of the supply vessel then the assembly line and the support frame of the assembly and winding site. This allows for a more efficient use of space on the supply vessel.

The crane for transferring the reel from and to the pipelaying vessel may be located on the assembly and winding site, e.g. on the supply vessel if applicable. Alternatively, the crane may be arranged on the pipelaying vessel. A pipelaying vessel usually requires a crane for multiple tasks and operations. This crane may be adapted to be suitable to transfer the reels, so that no extra crane is required.

The crane may further be provided with hoisting means that are able to couple with an interchangeable reel thereby allowing to transfer the reel such that the orientation of the part of the reel that has to align with another part on the pipelaying vessel or the assembly and winding site remains substantially the same to allow easy alignment between those parts.

The crane preferably has a small footprint to minimize the occupied deck space. The crane may therefore be of the mast crane or pedestal mounted crane type. To further increase the amount of usable deck space, the crane may be mounted in a corner of the deck or on one side of the deck.

In order to assist in positioning the reel (possibly including support frame) during interchanging, so-called tugger winches may be provided on the pipelaying vessel and/or assembly and winding site to be connected to the reel or support frame which tugger winches can aid in small positioning changes or can aid in keeping the reel stationary in one or more direction.

In an embodiment, the support frame supporting the reel on the vessel is moveable, e.g. skiddable in a horizontal direction perpendicular to a longitudinal axis of the floating body of the pipelaying vessel, e.g. parallel to a horizontal rotation axis of the by the support frame supported reel. This allows to align a portion of the pipeline to be laid that is present on the reel and about to be unwound from the reel with a guide configured to guide the pipeline to be laid into the body of water towards the floor of the body of water. In other words, the reel may be fleeted sideways during the unreeling so as to keep the actual point where the pipeline leaves the reel in a plane aligned with the pipeline guide. This allows to reduce the stresses in the pipeline and equipment handling said pipeline.

This alignment may also be obtained by moving the reel relative to the support frame. For instance, the reel body may be moveable, e.g. slidable, relative to the axle body of the reel in a direction parallel to the rotation axis of the axle body. Moving of the reel may be effected by a skid drive unit, but alternatively, the crane can also be used to move the reel possibly including support frame.

When the reel is interchangeable, but the support frames are not, the pipelaying vessel and/or the assembly and winding site may be permanently provided with a support assembly for an interchangeable reel with reel couplers, wherein said support assembly has separate reel supports to temporarily support a reel at a lower portion of the reel, and a support frame to vertically support said reel, said support frame comprising:
- a base member;
- a first arm extending vertically from the base member, said first arm comprising a frame coupler at or near a free end thereof to engage with a respective reel coupler of said reel;
- a second arm extending from the base member, said second arm comprising a frame coupler at or near a free end thereof to engage with a respective reel coupler of said reel, wherein the second arm is pivotably connected to the base member to move between a horizontal open position for receiving said reel and a vertical position for engagement with said reel, and wherein the reel supports and the support assembly are moveable relative to each other.

A reel that is interchanged will first be positioned on the reel supports, the second arm of the support frame will be positioned in the horizontal open position, after which the support frame and the reel supports move relative to each other until the reel is positioned above the base member and the frame coupler of the first arm is aligned with the respective reel coupler of the reel. The second arm is then positioned in the vertical position, so that the reel can be coupled to the support frame and subsequently the weight of the reel can be transferred from the reel supports to the support frame.

An advantage of the support assembly as described above and the associated method to transfer a reel to a support frame of such a support assembly is that it is ensured that the location of the reel is known during coupling of the support frame and the reel. When the reel is transferred directly to the support frame while for instance being suspended by a crane, motions of the crane or the vessel may result in a collision between the reel and the support frame damaging the support frame or reel. By first positioning the reel on separate reel supports where relative motions have less impact and no complex coupling is required, and subsequently transferring the reel to the support frame, a more reliable transfer process is obtained.

Coupling the reel to the support frame usually requires alignment between the reel and the support frame in at least five and possibly six degrees of freedom. Preferably, the alignment between the reel supports and the reel can be done in less degrees of freedom, preferably in three degrees of freedom, namely two translations and one rotation, thereby reducing the complexity of the coupling and/or chance of damage during alignment.

The reel supports may be configured as two, three, four, or more support elements extending upwards from the deck, and preferably being configured to engage with an outer lower portion of the reel, e.g. the periphery of the sidewalls or flanges.

In order to implement the moveability of the support frame and the reel supports, one of the support frame and the reel supports may be moveable, where the other one is fixed. Alternatively, both the support frame and the reel supports may be moveable. In an embodiment, the reel supports are moveable relative to each other to handle different reel sizes.

In an embodiment, the reel supports are configured to support the reel such that the second arm passes, while being in the horizontal open position, below the reel during the movement of the reel supports and the support frame relative to each other, which movement results in the positioning of the reel above the base member and alignment of the frame coupler of the first arm with the respective reel coupler of the reel. Said movement is preferably in a horizontal direction parallel to the rotation axis of the reel.

In an embodiment, the first and second arm are both provided with a respective actuator, e.g. a hydraulic cylinder, to adjust the lengths of the respective arms enabling to lift the reel from the separate reel supports. It is conceivable that the actuator of the second arm can only be actuated while being in the vertical position. Alternatively, or additionally, the actuator of the second arm can be configured such that the second arm is always retracted in the horizontal open position. A drive system, e.g. a motor, may be provided on the base member to drive the actuators of the respective arms.

In an embodiment, the reel supports may be moveable in a vertical direction, so that they may move to a lower position, thereby transferring the weight of the reel to the support frame. Preferably, the reel supports may move below the upper surface of the respective deck, so that other equipment, such as the skid drive unit, support assembly, etc., may easily move over the reel supports.

After transferring the weight of the reel from the reel supports to the support frame, e.g. by lifting the reel from the reel supports, the reel supports preferably move relative to the support frame, so that they do not interfere during subsequent handling of the reel. After providing an appropriate distance between the support frame and the reel supports, the reel may be lowered to a position in which the energy consumption may minimal and/or in which the stability of the support frame and reel is maximal. At least the potential energy due to gravity is lower in the lower position.

The reel and frame couplers should engage such that a proper transfer of weight from the reel to the support frame is ensured. In an embodiment, the frame couplers of the first and second arm are configured to engage with the reel couplers of the reel from beneath.

In an embodiment, the reel supports are stationary mounted to the deck or any other kind of reference structure and the support frame is moveable relative to the deck, so that the moveability of the support frame can also be used to align the reel with other equipment such as guides, assembly lines, etc. The moveability of the support frame may be provided by a skid drive unit that is able to skid the support frame along a track, wherein said skid drive unit may be arranged on the support frame, or may be provided separately from the support frame.

Interchanging the reel via the reel supports is possible when not more than one reel is handled at a time by the support assembly. To be able to handle more than one reel by the support assembly at a time, the support assembly may be provided with a further set of reel supports or with a reel handler. The reel handler is preferably configured to remove a reel, e.g. an empty reel, from the support frame while the second arm remains in the vertical position and is disengaged from the reel. The reel handler may be a crane, but preferably, the reel handler is provided in the form of a cart which is allowed to move below the reel, take over the weight of the reel and move the reel away from the support frame by moving in a horizontal direction perpendicular to a rotation axis of the reel.

In an embodiment, the reel handler can be moved onto the support frame, i.e. onto the base member to get below the reel. The base member may therefore be provided with guide elements that can be aligned with guide elements on the deck.

The reel handler can thus be advantageously used to remove a reel from a support frame by performing the following steps:
 a) moving the reel handler below the reel;
 b) transferring the weight of the reel from the support frame to the reel handler;
 c) disengaging the reel from the support frame;
 d) moving the reel handler away from the support frame in a horizontal direction perpendicular to the horizontal rotation axis of the reel.

An advantage of this method is that the support frame may support a reel during a pipelaying process in which pipeline is unwound from the reel, wherein after the reel is emptied, the reel handler is able to remove the empty reel very fast as the second arm does not have to be pivoted to the horizontal open position first. After removal of the reel, the support frame is ready to "grab" a new, e.g. filled, reel as described earlier. The empty reel held by the reel handler can later on be removed by for instance a crane so that the reel handler is free to handle a next reel. These subsequent operations can be performed without interfering with and/or delaying the pipelaying process.

In an embodiment, the step of lifting the reel by the support frame is performed prior to moving the reel handler below the empty reel. In this way, the required space may be created and/or it will be easier to transfer the weight from the support frame to the reel handler by lowering the reel later on.

In an embodiment, transferring the weight of the reel from the support frame to the reel handler comprises the step of lowering the empty reel onto the reel handler by the support frame.

In an embodiment, the reel handler comprises reel engagement members to engage with the reel. Preferably, the reel engagement members are configured to engage with the reel body, preferably from beneath, thereby making the reel handler especially suitable for handling empty reels.

In an embodiment, the pipelaying vessel is configured such that multiple interchangeable reels can be stored on the pipelaying vessel, wherein at least one skid drive unit is provided allowing each reel to be moved from a storage position to an operational position in which the pipeline stored on the reel can be unwound from the reel and laid on the floor of the body of water.

In the operational position the reel is positioned with respect to the pipeline guide so as to allow unreeling of said pipeline towards and over the guide during pipelaying on the subsea floor.

The ability of storing, i.e. supporting, more than one interchangeable reel on the pipelaying vessel has the advantage that at least two filled reels can be carried by the pipelaying vessel at the same time, so that after one is emptied, the other can be used to continue pipelaying without the need to return to the assembly and winding site.

If it is possible to supply fresh filled reels to the pipelaying vessel without having to interrupt the pipelaying process, e.g. because the assembly and winding site is provided on a separate supply vessel which is able to get close to the pipelaying vessel, or a further supply vessel is able to move the reels from the assembly and winding site to the pipelaying vessel, there is also the possibility of interchanging an empty reel by a filled reel while pipelaying is continued with another reel. This reduces the down-time of the pipelaying process.

In an embodiment, the system comprises less interchangeable reels than positions to receive such a reel, e.g. less support frames than reels if the support frames are not interchanged along with the reels. An advantage is that it ensures that there is always at least one vacant position which can be used to temporarily position a reel during interchanging.

In an embodiment, the vessel is provided with a skid drive unit to move one or more support frames across the deck of the vessel, said skid drive unit comprising:
 a skid cart;
 connecting means to connect the skid cart to a support frame; and
 skidding means arranged between the skid cart and at least one skid beam to skid the skid cart along the at least one skid beam.

The skid drive unit is arranged separately from the support frame, thereby allowing the support frame to be interchanged with the reels, whereas the skid drive unit remains on the vessel. Even in case the support frame is not interchanged with the reel, the separate skid drive unit has the advantage that it is not limited to moving one support frame only. The connecting means allow the skid drive unit to connect with any support frame.

In an embodiment, the skid drive unit also comprises reel drive means on the skid cart to engage with the reel for rotation of the reel, e.g. for unwinding of the pipeline and/or for spooling the pipeline. This further makes it easier to interchange the reel with support frame as the weight is reduced.

In order to make efficient use of deck space on the pipelaying vessel, multiple storage positions may be provided on the pipelaying vessel adjacent the operational position.

The operational position may be provided in the form of a turning-table, wherein the storage positions are arranged in a circular manner around said turning-table. By turning said turning-table, the skid beams or guides provided on the turning-table can be aligned with corresponding skid beams or guides at the storage positions to allow the transfer of a reel from the storage position to the operational position. A skilled person will understand that arranging the storage position in a circular manner around the turning-table does not necessarily result in a full circle of storage positions. The storage positions together may also form part of a circle.

In an embodiment, movement of the reels from the storage position to the operational position may involve movement in a horizontal direction parallel to the longitudinal axis of the pipelaying vessel and/or movement in a horizontal direction perpendicular to the longitudinal axis of the pipelaying vessel. The sum of storage positions and operational position may together form different shapes, such as a L-, T-, U-, H-shaped configurations or combinations thereof, wherein the operational position is usually positioned near or at the centre of the shape.

In an embodiment, the pipelaying vessel is provided with two storage positions and an operational position which are arranged on a common line extending perpendicular to the longitudinal axis of the pipelaying vessel. This allows at least two reels to be positioned on the pipelaying vessel, wherein each reel is moveable along said line in and out of the operational position.

In an embodiment, an additional storage position is provided on the pipelaying vessel which is arranged adjacent one of the other storage positions seen in the longitudinal direction of the pipelaying vessel, i.e. said additional storage position is not arranged on the line extending perpendicular to the longitudinal axis of the pipelaying vessel.

In an embodiment, a storage position may be positioned outside the main contour of the floating body of the pipelaying vessel, for instance using a cantilever extending from the floating body.

In an embodiment, the paths between storage positions and operational positions are defined by guides or tracks, such as skid beams or rails.

In an embodiment, paths defined by guides or tracks extending in the horizontal direction parallel to the longitudinal axis of the pipelaying vessel and guides or tracks extending in the horizontal direction perpendicular to the longitudinal axis of the pipelaying vessel overlap each other, wherein a skid drive unit is configured to transfer the reel from one path to another at the overlapping region. This can be done by a single skid drive unit that is able to move from one path to the other, but each path may also be provided with an associated skid drive unit such that one skid drive unit is able to position a reel at the overlapping region and subsequently moves away so that the other skid drive unit is able to pick up the reel and position the reel on the corresponding path.

In an embodiment, the pipelaying vessel may be provided with two types of skid drive units. A first type may be adapted and used to a move support frame including reel from storage position to storage position. The second type may be adapted and used to move a support frame including reel between a storage position and the operational position. The second type is preferably provided with the reel drive means. The first type preferably not, as the reel drive means are in principle only necessary in the operational position. Preferably, the skid drive unit of the first kind is used to move the one or more reels in a horizontal direction parallel to the longitudinal axis of the pipelaying vessel, whereas the skid drive unit of the second kind is used to move the one or more reels in a horizontal direction perpendicular to the longitudinal axis of the pipelaying vessel.

In an embodiment, there are multiple moveable support frames present on the pipelaying vessel, each being moveable along a corresponding path, preferably a common path. Preferably, a portion of said paths is parallel to the rotation axis of the reel when supported by a support frame.

In an embodiment, the skid cart can be skidded to a position underneath the reel while supported by the support frame, thereby allowing the reel drive means on the skid cart to engage with the reel from beneath.

Preferably, the skid cart is able to pass a support frame, preferably below the reel supported by said support reel, so that the skid cart is able to reach every support frame on its path that is supported by the pipelaying vessel.

In an embodiment, at least a portion of the reel drive means is configured to engage with a radially seen outer contour of the rotatable part of the reel, wherein preferably said portion of the reel drive means is moveable relative to the skid cart between an engaged position in which said portion is engaged with said reel, and a disengaged position in which said portion is disengaged from the reel. This may allow the skid cart to pass the reel.

The rotatable part of the reel may be provided with two reel flanges and a central part in between the two reel flanges to store the pipeline on the central part in between the two reel flanges. The reel drive means may be configured to engage with only one of the two reel flanges.

The reel flange, e.g. the outer contour of the reel flange, may comprise a rack, where the reel drive means may comprise a gear to cooperate with said rack and a motor to drive said gear.

In an embodiment, the reel flange engaging with the reel drive means comprises a rack flange on the outer contour of the reel flange, wherein said rack is arranged on the rack flange, and wherein the reel drive means comprises guide wheels configured to run on both sides of the rack flange when the rack engages with the gear for driving said reel. By providing the guide wheels, the rack and gear are better coupled with respect to each other and forces can be applied more easily to the reel by the reel drive means.

The guide wheel configured to run on the inside surface of the rack flange is preferably mounted on a guide wheel assembly that is moveable between an open position in which the rack flange is able to pass said guide wheel and a closed position in which said guide wheel is able to engage with the inside surface of the rack flange.

Using a skid drive unit to move support frames over the deck of a pipelaying vessel, pipelaying may be done by performing the following steps:
 a) providing an interchangeable reel filled with pipeline on a support frame in a storage position on the deck of the pipelaying vessel;
 b) connecting a skid cart of the skid drive unit to the support frame;
 c) skidding the support frame and reel to the operational position;
 d) laying the pipeline into a body of water by unwinding the reel with reel drive means;
 e) uncoupling the laid pipeline from the reel;
 f) moving the support frame and reel to a storage position;
 g) disconnecting the skid cart from the support frame.

In an embodiment, the step of engaging the reel drive means with the reel may be performed before step d), where the step of disengaging the reel drive means from the reel may be performed after step d).

In an embodiment, the reel is constantly aligned with a guide on the pipelaying vessel in a horizontal direction perpendicular to the longitudinal axis of the vessel by the skid cart during step d).

In an embodiment, the pipelaying vessel is provided with a hang-off clamp and tensioners, which allows the following procedure for replacing, i.e. interchanging, a reel on the pipelaying vessel:
 a) reel laying a first pipeline form an interchangeable first reel by unwinding said first reel, guiding the first pipeline via a guide through the tensioners and the hang-off clamp into the sea;
 b) closing the hang-off clamp to support the first pipeline;
 c) replacing the first reel by an interchangeable second reel with a second pipeline;

d) providing a cable through the tensioners via the guide to the second reel;
e) connecting the second pipeline to the cable;
f) pulling the cable over the guide through the tensioners so that the second pipeline is pulled from the second reel over the guide and through the tensioners;
g) disconnecting the cable from the second pipeline;
h) connecting the first and second pipeline end to end, e.g. by welding, between the tensioners and the hang-off clamp;
i) opening the hang-off clamp;
j) continue reel laying the second pipeline.

In an alternative embodiment, the pipelaying vessel is provided with a hang-off clamp and tensioners, which allows the following procedure for replacing, i.e. interchanging, a reel on the pipelaying vessel:
a) reel laying a first pipeline from an interchangeable first reel by unwinding said first reel, guiding the first pipeline via a guide through the tensioners and the hang-off clamp into the sea;
b) closing the hang-off clamp;
c) while the launched first pipeline is supported by the hang-off clamp, connecting the end portion of the first pipeline which has not yet passed the guide wheel to a retaining system in the vicinity of the first reel;
d) replacing the first reel by an interchangeable second reel with a second pipeline;
e) providing a temporary connection between an end portion of the second pipeline and the end portion of the first pipeline while the first pipeline is supported by the retaining system;
f) disconnecting the first pipeline from the retaining system;
g) opening the hang-off clamp;
h) continue reel laying by unwinding the second reel and allowing the second pipeline to pass through the guide and the tensioners;
i) closing the hang-off clamp to hold the first pipeline;
j) removing the temporary connection between the first and second pipeline;
k) connecting the first and second pipeline end to end between the tensioners and the hang-off clamp.

In an embodiment, step k) is performed by a welding station provided between the tensioners and the hang-off clamp.

In an embodiment, the end portion of the first pipeline may be connected to the first reel, so that the procedure preferably comprises the step of disconnecting the end portion of the first pipeline from the first reel prior to replacing the first reel by the second reel.

In an embodiment, the retaining system comprises a retaining cable and a retaining winch, wherein the winch is configured to provide a desired hold-back force to hold the end portion of the first pipeline.

In an embodiment, the retaining system comprises two retaining cables and two respective retaining winches, wherein the two retaining cables are connected to the end portion of the first pipeline, and the winches are placed on a deck supporting the reel via a reel support, said retaining system being arranged such that the retaining cables form a V-door or V-shaped opening when connected to the end portion of the first pipeline through which the first reel can be replaced by the second reel.

In an embodiment, the retaining cables of the retaining system are connected to an intermediate member that is connected by a single cable to the end portion of the first pipeline.

The temporary connection between the first and second pipeline may comprise a sling, which may be provided between the intermediate member and the end portion of the second pipeline, in which case the intermediate member remains connected to the first and second pipeline when the retaining system is disconnected, but said sling may also be provided directly between the first and second pipeline, so that disconnecting the retaining system also involves the removal of the intermediate member.

It is specifically mentioned here that different features of the invention as described in the description and/or clauses/claims may readily be combined where appropriate.

Figure 2:
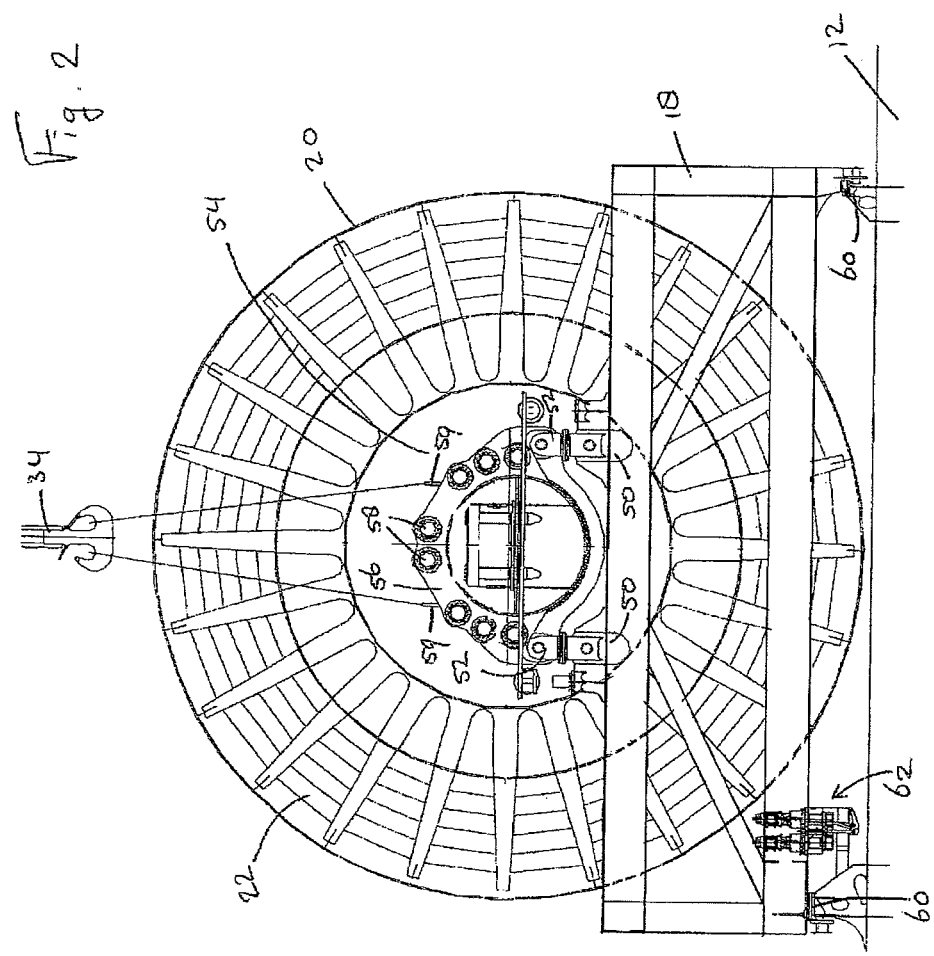
Figure 3:
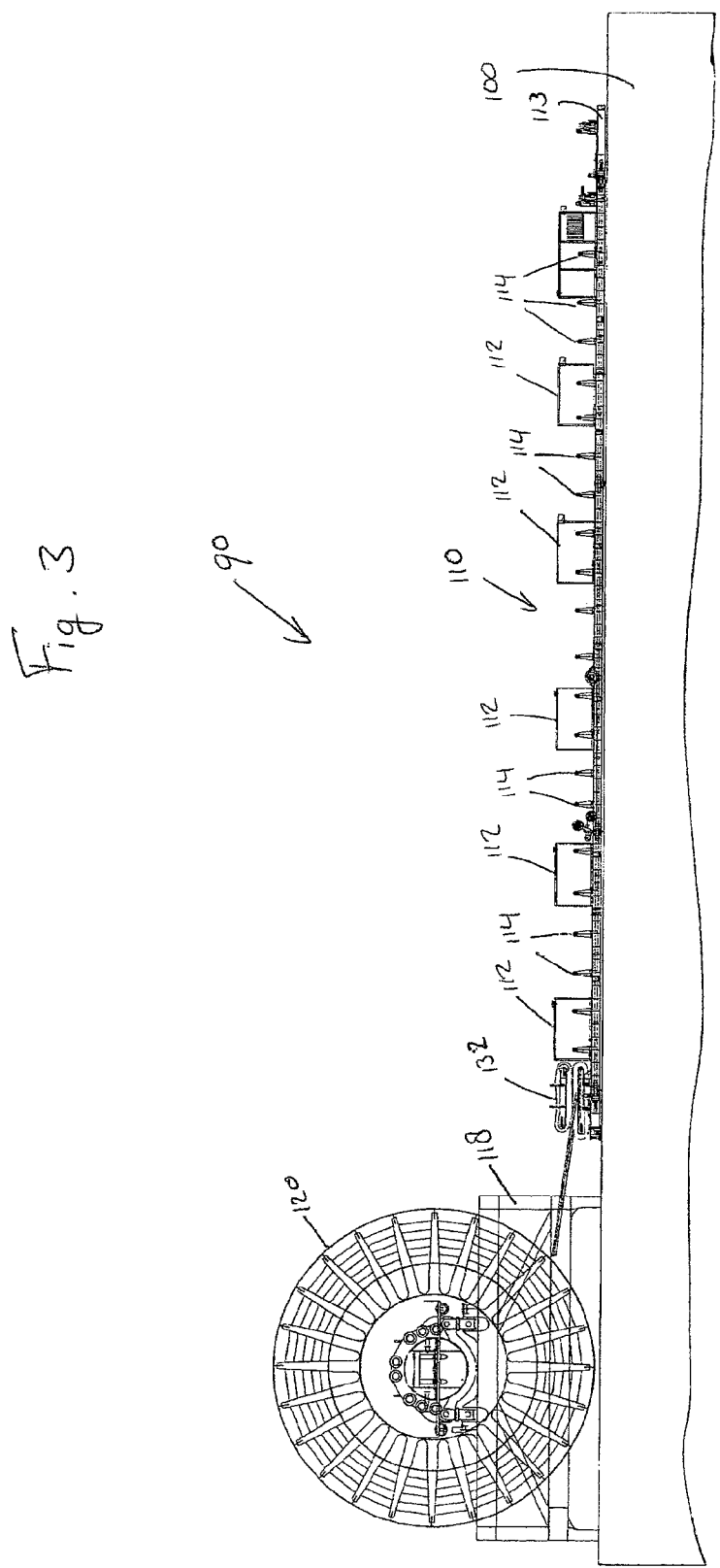
Figure 4:
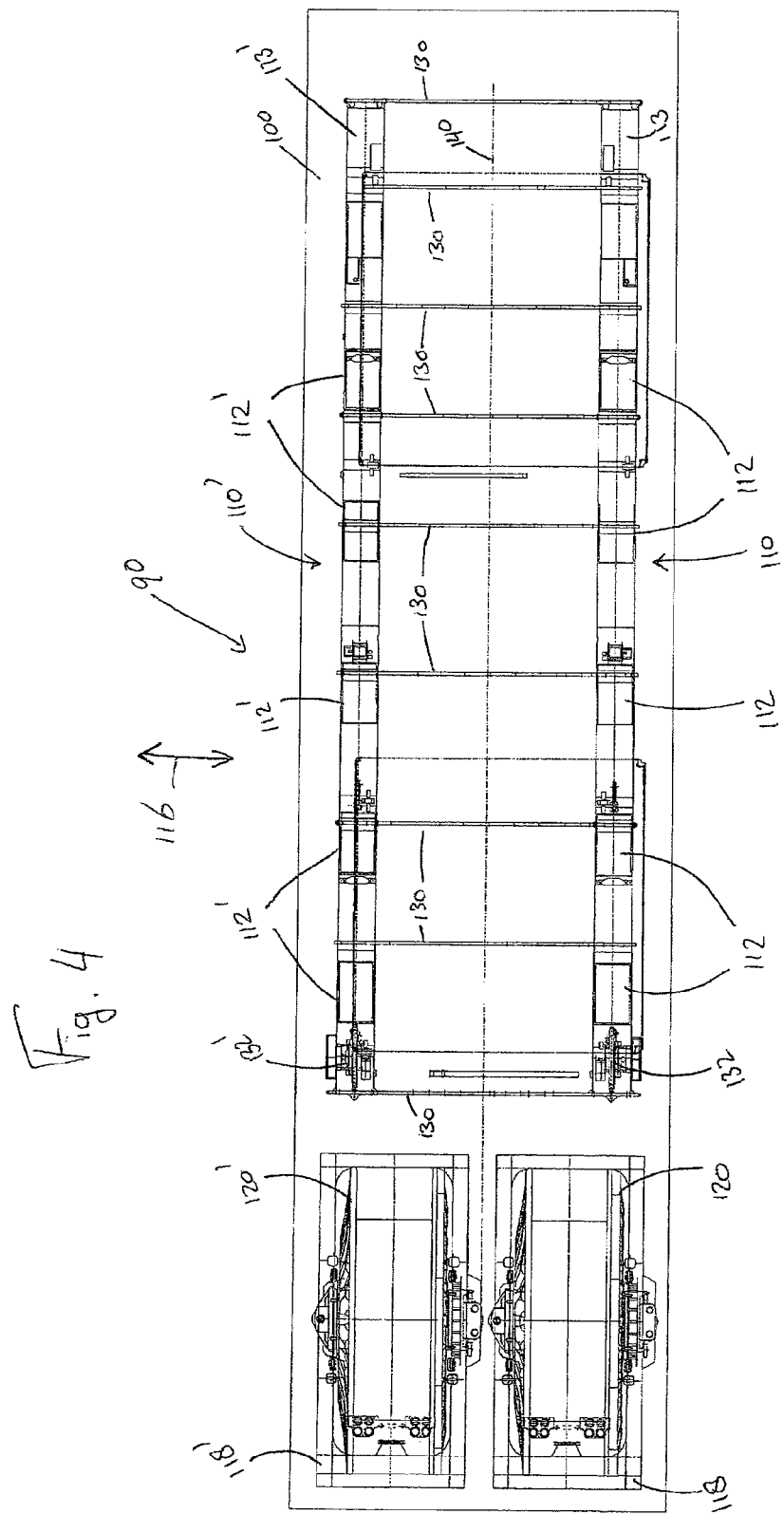
Figure 5:
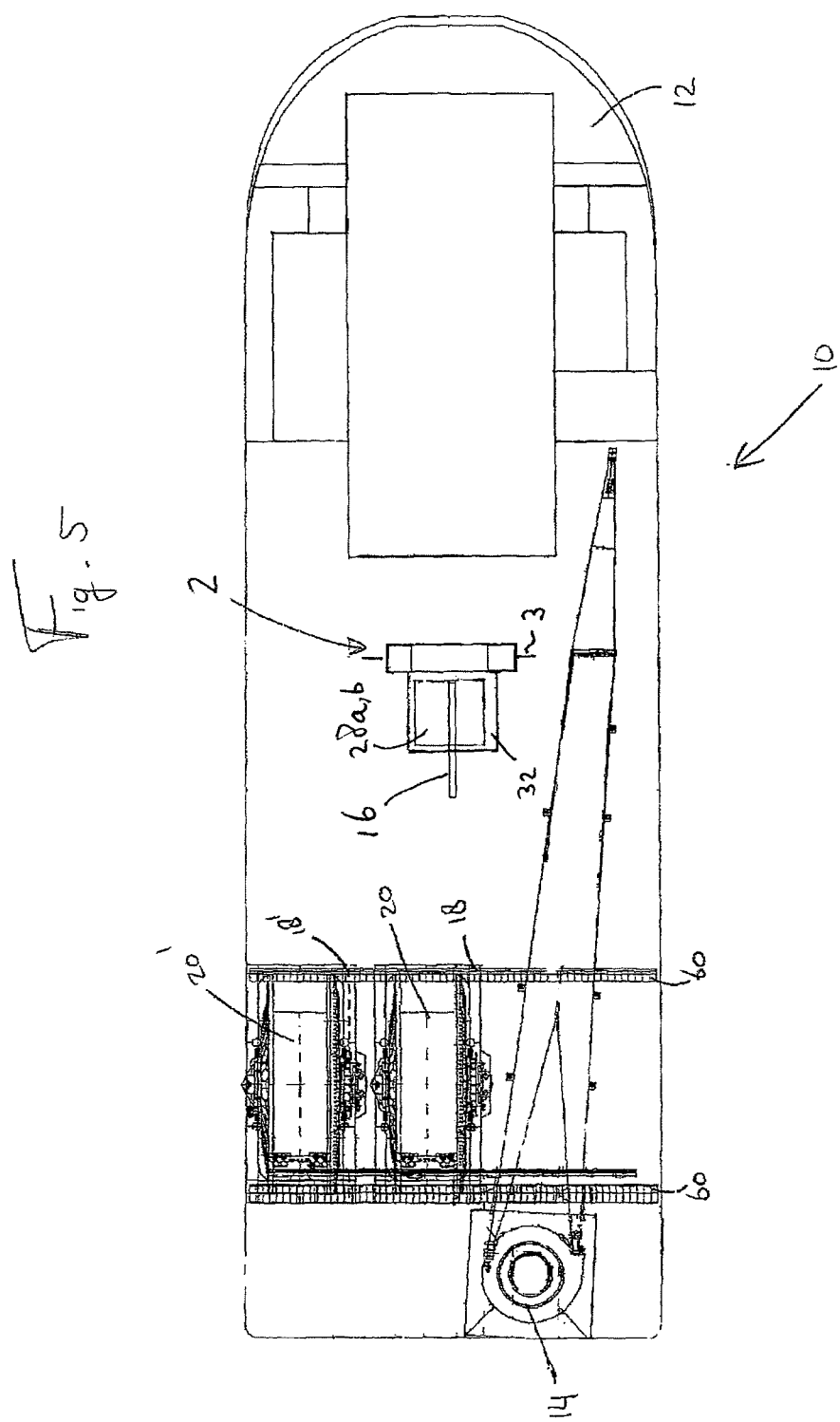
Figure 24:
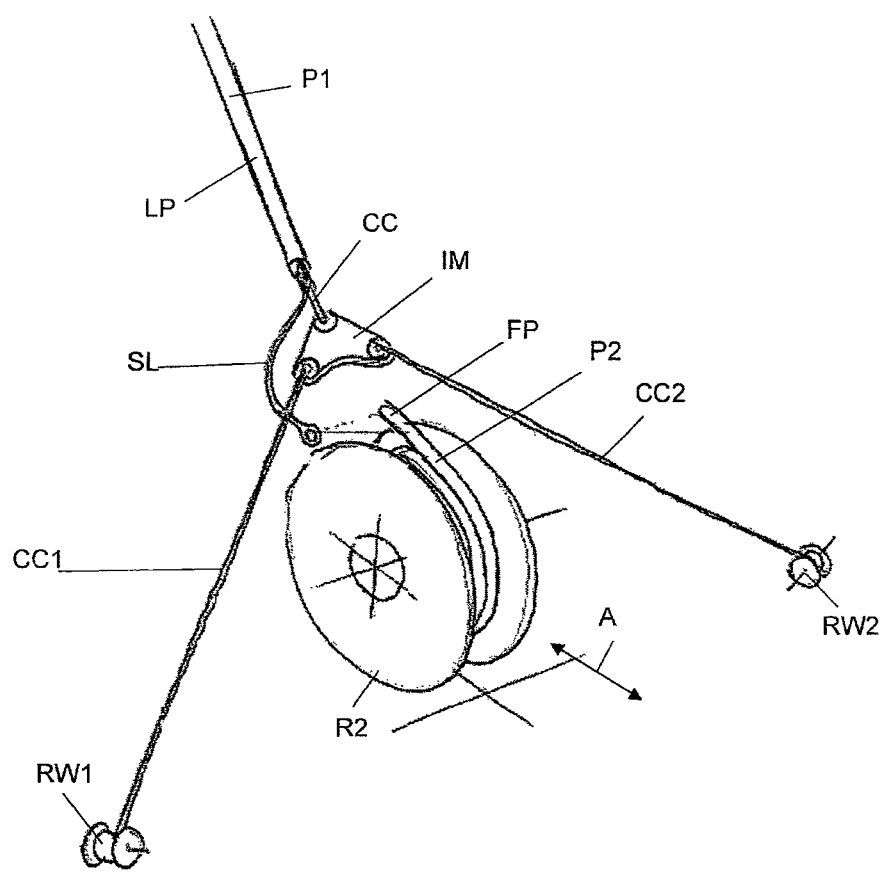
Figure 25:
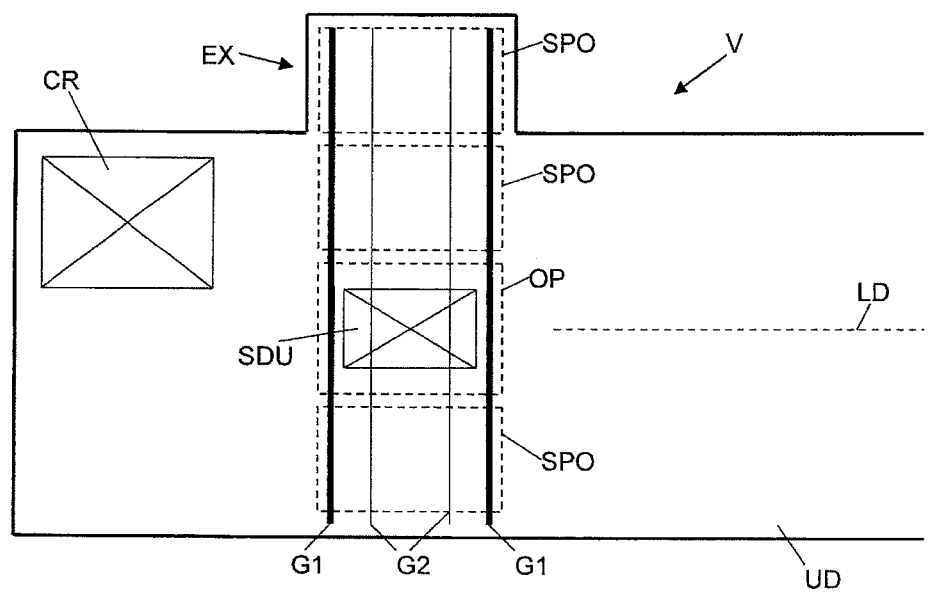
Figure 26:
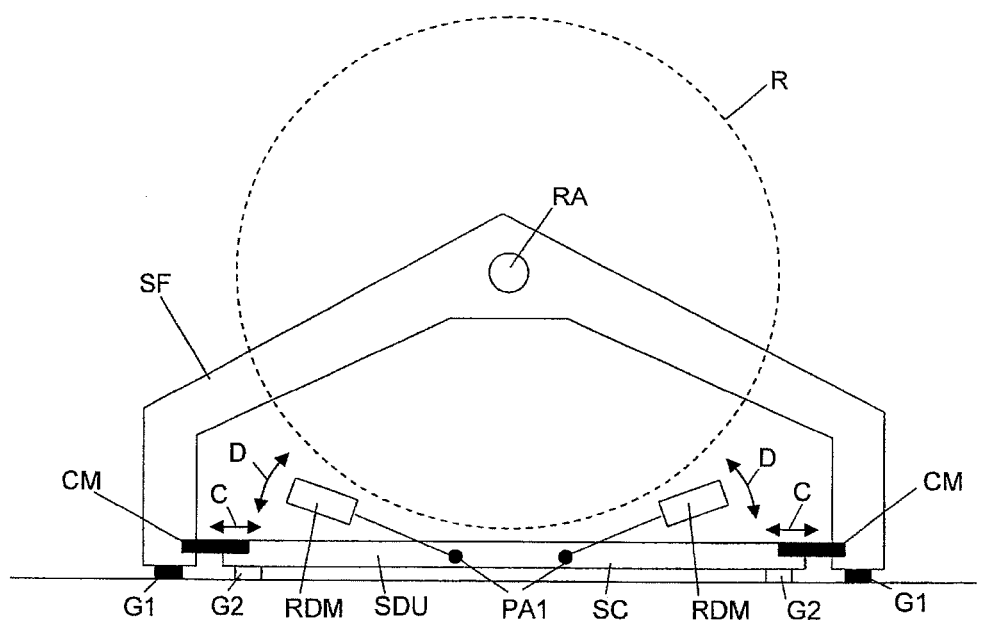
Figure 27:
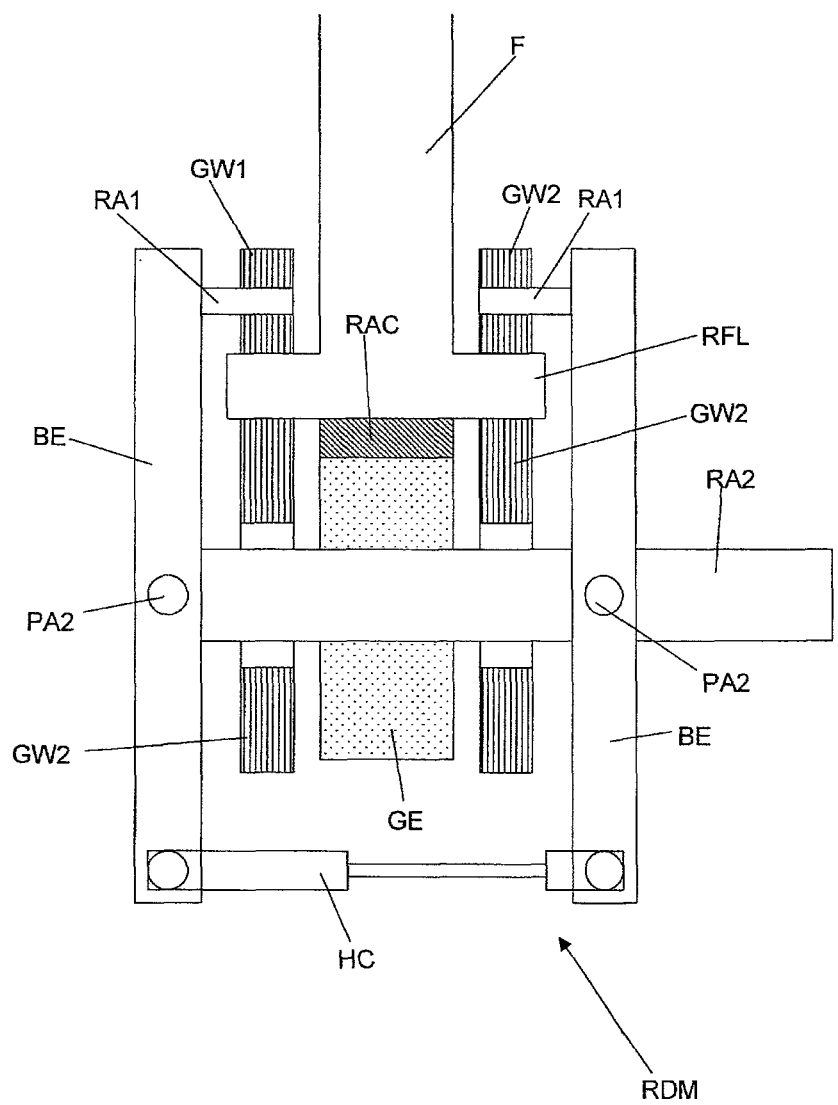
Figure 28:
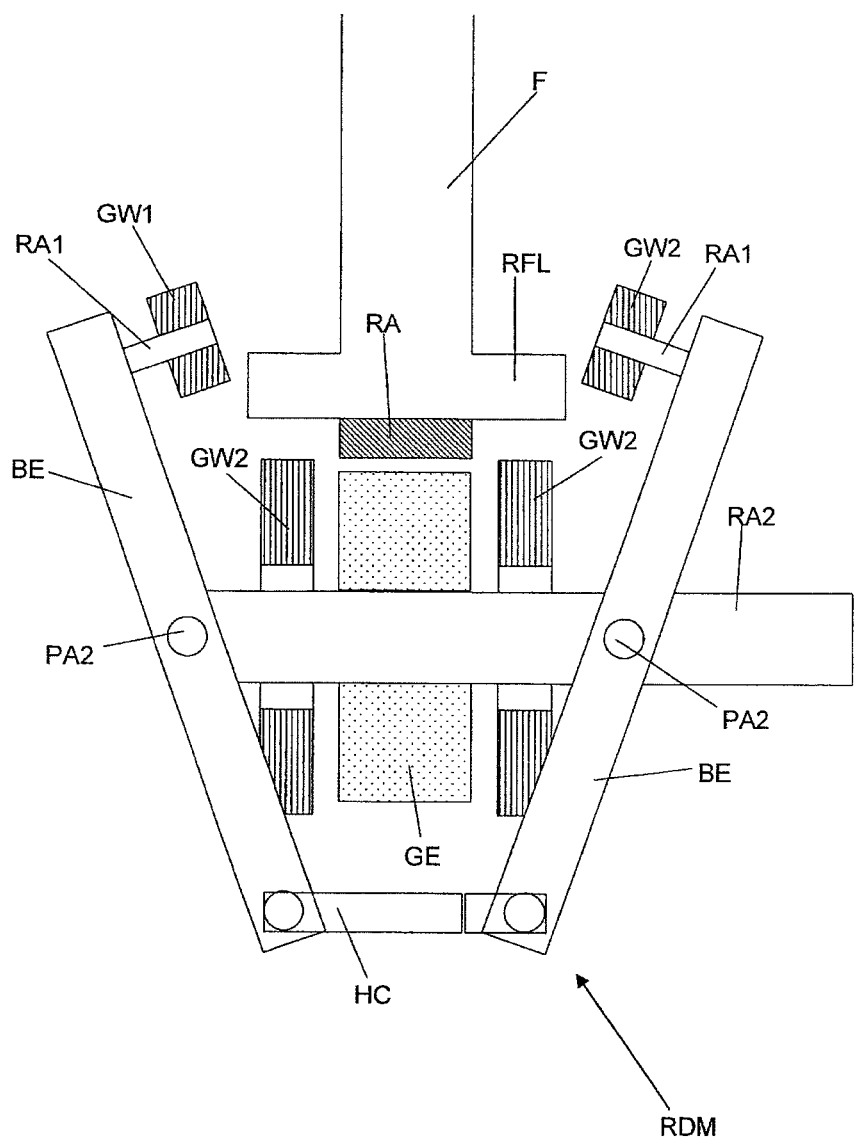
Figure 29:
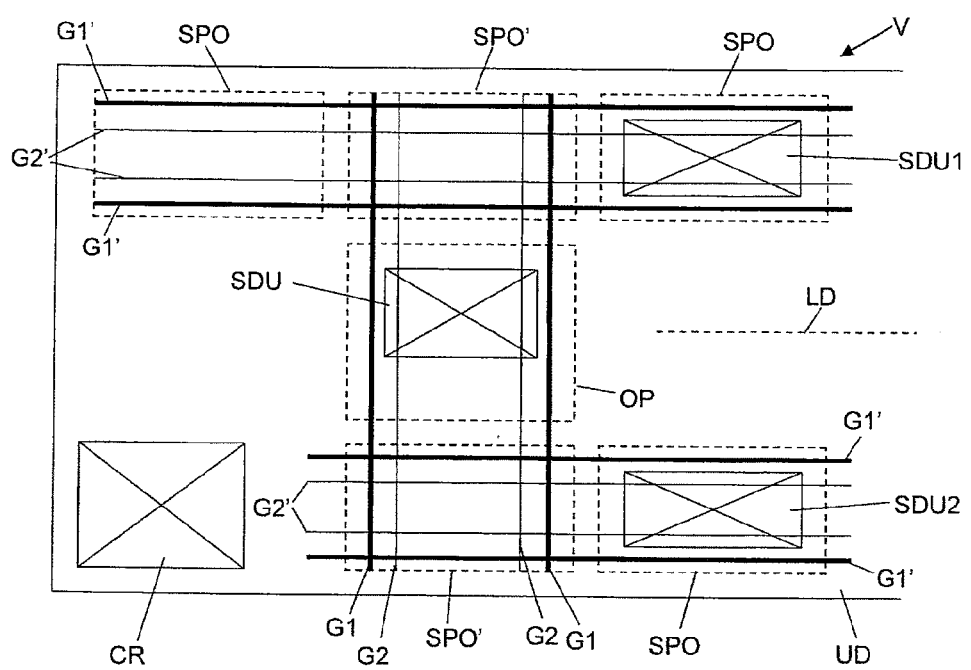

The invention will now be described in a non-limiting way with reference to the drawing in which like parts have like reference symbols, and in which:

FIG. 1 depicts a pipelaying vessel according to an embodiment of the invention;
FIG. 2 depicts in more detail a support frame and interchangeable reel of the pipelaying vessel of FIG. 1;
FIG. 3 depicts a side view of a supply vessel according to an embodiment of the invention;
FIG. 4 depicts a top view of the supply vessel of FIG. 3;
FIG. 5 depicts a top view of the pipelaying vessel of FIG. 1;
FIGS. 6-14 depict schematically a support assembly according to an embodiment of the invention in different operational steps;
FIGS. 15-18 depict schematically a support assembly according to another embodiment of the invention in different operational steps;
FIGS. 19-23 depict a schematic view of a pipelaying process according to an embodiment of the invention;
FIG. 24 depicts a retaining system according to an embodiment of the invention for use in a pipelaying process, e.g. the pipelaying process of FIGS. 19-23;
FIG. 25 depicts a rear side of a pipelaying vessel according to an embodiment of the invention;
FIG. 26 depicts a support frame including reel and a separate skid drive unit according to an embodiment of the invention;
FIG. 27-28 depict reel drive means suitable for the skid drive unit of FIG. 26;
FIG. 29 depicts a rear side of a pipelaying vessel according to another embodiment of the invention;
FIG. 30 depicts an embodiment of the invention.

FIG. 1 depicts a pipelaying vessel 10 according to an embodiment of the invention. The pipelaying vessel comprises a floating body 12 and arranged on the floating body 12 a crane 14, a guide 16, a support frame 18, and an interchangeable reel 20 vertically supported by said support frame 18.

FIG. 1 illustrates a pipelaying tower 2, as is preferred a tower 2 that is tiltable about axis 3 with respect to the vessel 10. Here a telescopic tilting device 5 is provided. In this example, the vessel 10 has a moonpool 32. The tower 2 is arranged so that the pipeline to be laid extends along the tower 2 into the moonpool 32 as indicated by line 30.

The tower 2 is provided with one or more tensioners, here two tensioners 28a, 28b. In addition, the vessel can be provided with one or more static pipeline clamps, e.g. a hang-off clamp.

At an elevated position above the one or more tensioners, the tower 2 supports the pipeline guide 16, e.g. in a mobile manner with respect to the tower 2.

The reel 20 is shown in a filled state, i.e. including a pipeline 22 wound around the reel 20. The pipeline 22 to be laid extends from the reel 20 in operational position to the guide 16 along a path 24.

In this embodiment, the guide 16 comprises a wheel 26 that guides the pipeline into a substantially vertical or slightly inclined orientation indicated by line 30 so that the pipeline is directed towards a floor of a body of water in which the floating body 12 floats. After passing wheel 16, the pipeline passes the two tensioners 28a, 28b which lower the pipeline and bear the weight of the pipeline already laid. After passing the tensioners, the pipeline passes the moonpool 32, i.e. a hole or opening in the floating body 12 through which the pipeline can be lowered.

Additionally, a straightener may be provided between the guide 16 and the tensioner 28a to straighten the pipeline. Said straightener is particularly suitable when laying a rigid pipeline which is wound on the reel 20 by plastic deformation.

The crane 14 which can be used during various operations on the pipelaying vessel is also used to transfer the interchangeable reel 20 to and from the pipelaying vessel 10. The crane therefore comprises hoisting means 34 to hoist the reel 20. In FIG. 1, the hoisting means are connected to the reel 20.

The support frame 18 is moveable in a horizontal direction perpendicular to a longitudinal axis 36 of the floating body 12. The support frame 18 and the reel 20 are shown in more detail in FIG. 2.

It is noted here that the orientation of the support frame 18 including the reel 20 may be rotated 90 degrees about a vertical axis, so that the rotation axis of the reel is parallel to the longitudinal axis 36 of the floating body.

FIG. 2 shows the support frame 18 and the reel 20 in more detail. Around the reel 20 pipeline 22 is wound. The reel comprises a reel body 54 and an axle body 56 around which the reel body is rotatable and reel couplers 52 which cooperate with respective frame couplers 50 arranged on the support frame 18. Coupling the reel couplers 52 to the frame couplers 54 releasably couples the reel to the support frame. Between the axle body and the reel body, actuators 58, of which only two are designated with reference numeral 58, are provided as reel drive means to rotate the reel body with respect to the axle body.

The reel and frame couplers can be any kind of mechanism that is able to releasably connect the support frame to the reel. A coupler may in a simple embodiment comprise a flange with holes that can be bolted to another flange of another coupler. It is also possible that a coupler comprises a male part to be inserted into a female part of another coupler to couple the support frame to the reel.

The support frame 18 is moveable along a track comprising rails 60. Positioning the support frame relative to the floating body 12 is done via support frame drive means 62 arranged between the support frame 18 and the floating body 12, e.g. between the support frame 18 and rails 60.

The axle body 56 further comprises attachment elements 59 to attach the reel to the hoisting means 34 of the crane.

FIG. 3 depicts a supply vessel 90 according to an embodiment of the invention. The supply vessel comprises a floating body 100 and on top of the floating body an assembly and winding site. The assembly and winding site comprises a support frame 118 and an assembly line 110. The assembly line 110 in this embodiment comprises a frame 113 on which multiple working stations 112 are provided to join pipe section together end to end, preferably by welding. Also arranged on the frame 113 are multiple guidance elements 114, of which only a few are designated by a reference numeral. The guidance elements support the pipe sections and guide them when the joined pipe sections are spooled onto an interchangeable reel 120. In the figure, the reel is shown in a supported state in which the support frame is supporting the reel 120. The reel and support frame have respective reel and frame couplers similar to the support frame and reel as shown in FIG. 2.

In FIG. 4, the supply vessel 90 of FIG. 3 is shown in top view. At the bottom of the figure, the assembly line 110 and support frame 118 can be seen carrying reel 120. Next to the assembly line 110 and support frame 118, a further assembly line 110' and a further support frame 118' are shown, which in this case are similar to the assembly line 110 and the support frame 118. The support frame 118' supports a respective interchangeable reel 120'. The support frames 118 and 118' are rigidly connected to the floating body 100. The respective frames 113 and 113' of the assembly lines are moveable in a horizontal direction perpendicular to a longitudinal axis 140 of the floating body 100, indicated by arrow 116. To allow the smooth movement of both assembly lines, the frames are moveable along tracks comprising rails 130.

The reels 120 and 120' are as is preferred of the design as shown in FIG. 2.

At an end of the assembly lines being the closest to the support frames a respective tensioner 132 and 132' is provided to apply tension to the pipeline that is wound around the reel. Also clearly derivable from the FIGS. 3 and 4 is that the support frames are in line with their respective assembly line.

The supply vessel of FIGS. 3 and 4 is able to cooperate with the pipelaying vessel of FIG. 1. Empty reels 120, 120' can be filled on the supply vessel and transferred to the pipelaying vessel where they are used to lay a pipeline. After emptying the reels, they can return to the supply vessel to be filled again.

FIG. 5 depicts a top view of the pipelaying vessel of FIG. 1, wherein the reel 20 is no longer connected to the hoisting means of the crane 14. Next to the support frame 18 is a further support frame 18' shown that is also moveable in a horizontal direction perpendicular to the longitudinal direction of the floating body 12 of the pipelaying vessel. In fact, in this embodiment, the further support frame 18' is moveable along the same track as support frame 18 and thus is also moveable over the rails 60. Support frame 18' supports a respective interchangeable reel 20' similar to the support frame 18 and corresponding reel 20.

As can be clearly seen in FIG. 5, there is enough moving space for both support frames to align the respective reels with the guide 16 if required.

Figure 6:
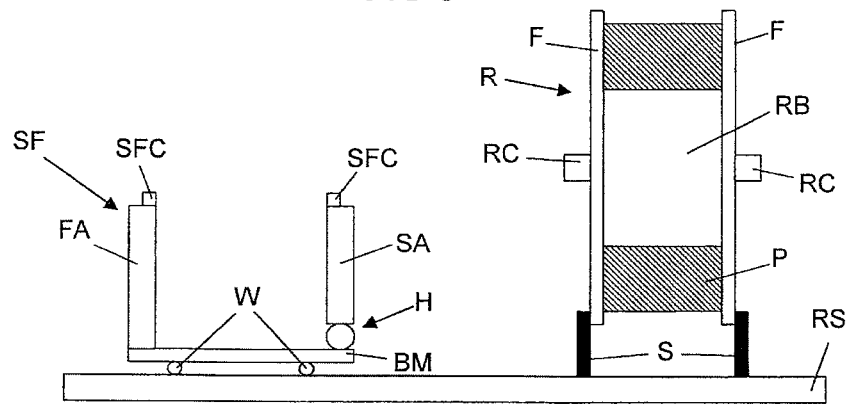

FIG. 6 depicts a support assembly according to an embodiment of the invention. Shown are a support frame SF and separate reel supports S which are provided on a reference structure RS such as a deck of a vessel or on an assembly and winding site. The support frame SF is moveably arranged on the reference structure RS and the separate reel supports S are rigidly mounted to the reference structure RS, so that the support frame SF is moveable relative to the supports S.

Figure 7:
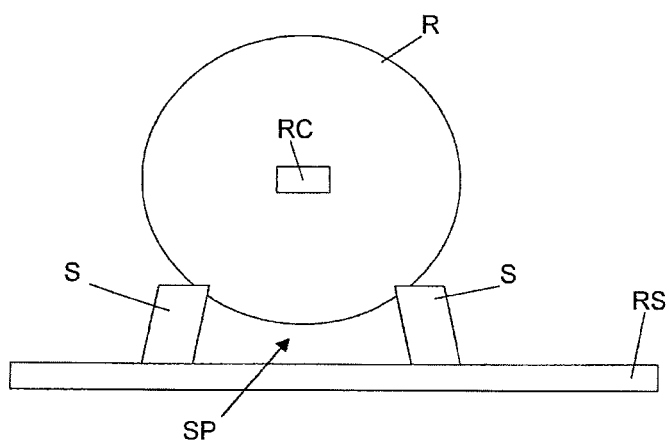

The supports S support a reel R having two flanges F and a reel body RB between the two flanges on which a pipeline P is wound. The reel is provided with reel couplers RC. The reel R is an interchangeable reel and has been transported from somewhere else to the separate reel supports S, for instance by a crane. In this embodiment, the separate reel supports S support the reel at the flanges F as is also shown in FIG. 7. This allows an easy transfer to the supports.

FIG. 7 clearly shows that the separate reel supports S leave a space SP below the reel R unoccupied for the support frame SF as will be explained below. In total, four separate reel supports are provided to support the reel in a stable manner.

Referring to FIG. 6, the support frame comprises a base member BM, a first arm FA, and a second arm SA. Each of the first and second arm FA, SA comprise a frame coupler SFC at a free end thereof for engagement with the respective reel couplers RC of the reel R as will be explained below. The first arm is fixed to the base member at a bottom end. The second arm is pivotably connected to the base member at a bottom end via a hinge H. The hinge allows the second arm to rotate about a horizontal axis between a horizontal open position as depicted for instance in FIG. 8 and a vertical position as depicted for instance in FIG. 6.

The moveability of the support frame SF is schematically depicted by two wheels W between the base member BM and the reference structure. The wheels may be guided by rails (not shown) or other guide elements. In an alternative embodiment, the support frame SF is skiddable relative to the reference structure.

Figure 8:
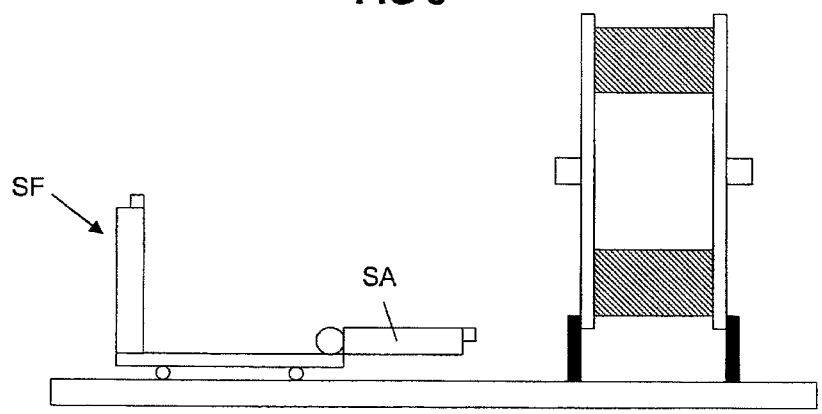

In FIG. 6, the reel has been positioned on the separate reel supports S. In FIG. 8, the second arm SA of the support frame SF is rotated from the vertical position of FIG. 6 to the horizontal open position.

Subsequently, the support frame is moved relative to the supports S and thus relative to the reel R until the reel is located above the base member so that the frame coupler of the first arm is aligned with the corresponding reel coupler of the reel, see FIG. 9. The second arm moved in this embodiment below the reel R between two pairs of separate reel supports S in space SP as indicated in FIG. 7, i.e. the second arm has passed the reel R.

FIG. 10 shows that after moving of the support frame below the reel, the second arm is moved back to the vertical position, so that the reel is captured, i.e. received in between the first and second arm.

The first and second arm are provided with a corresponding actuator (not shown) allowing to adjust the length of the first and second arm. These actuators are operated to increase the length of the first and second arm until the frame couplers SFC of the support frame engage with the reel couplers RC of the reel as shown in FIG. 11. Coupling may require some fastening operations depending on the type of coupling, e.g. bolting or clamping.

Figure 12:
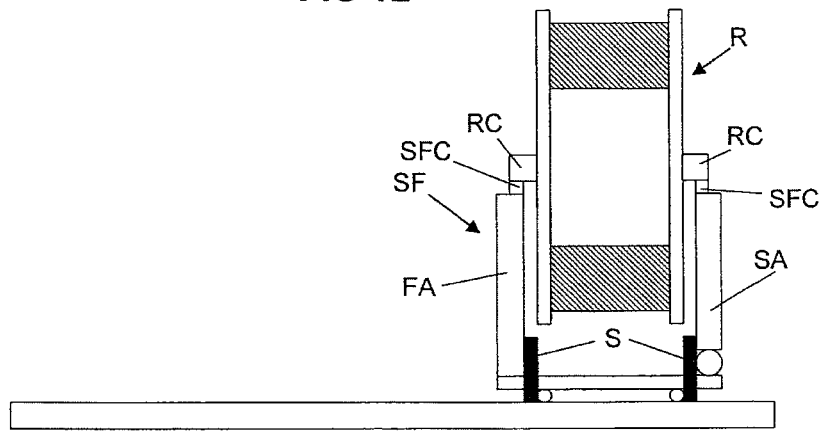

To transfer the weight of the reel from the separate reel supports S to the support frame SF, and to be able to move the reel away from the separate reel supports S, the reel is lifted in this embodiment from the separate reel supports by a further extension of the first and second arm as shown in FIG. 12.

Figure 13:
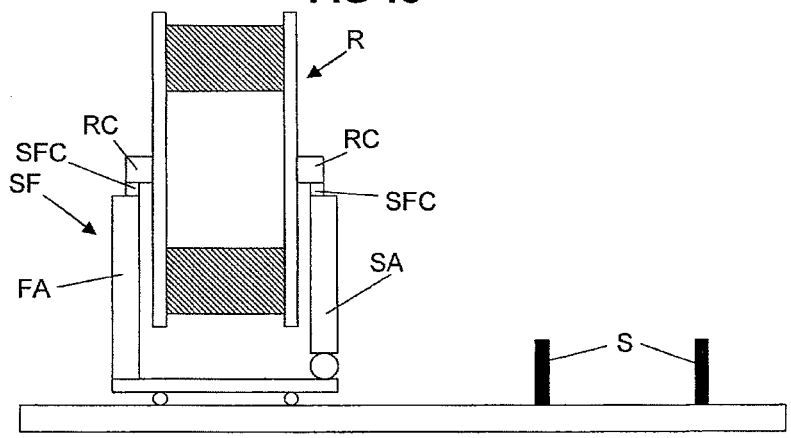
Figure 14:
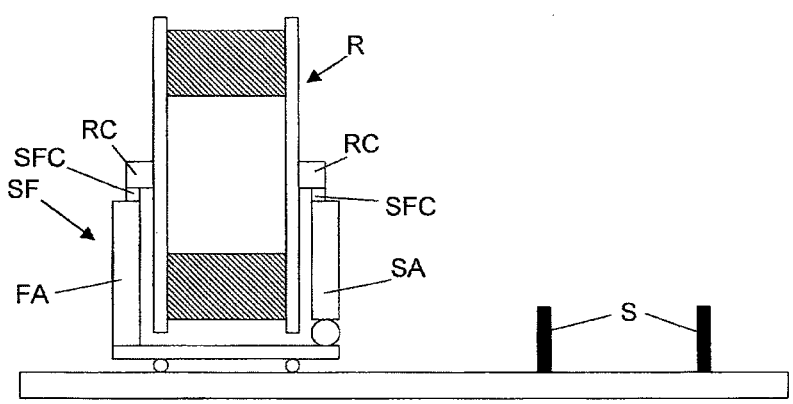

As the reel is now free from the separate reel supports S, the reel can be moved sideways, i.e. in a direction parallel to the rotation axis of the reel, by moving the support frame accordingly. The result of the sideways motion is shown in FIG. 13. Keeping the reel high in the air may in this stage not be particularly necessary, so the reel can be lowered by a corresponding shortening of the first and second arm as shown in FIG. 14. This position may be a rest position of the actuators in the first and second arm, wherein rest position means that supporting the reel requires a minimal amount of energy. Lowering the reel may further increase the stability of the support frame and reel. The sideways motion of the support frame can also be used to align the pipeline to be unspooled from the reel with a pipelaying installation or guide which may be part of a pipelaying installation.

FIG. 15 depicts a support assembly according to another embodiment of the invention, wherein an empty reel R is carried by a support frame SF. As the reel and support frame are shown in side view, only a first arm FA of the support frame extending vertically from a base member BM and having a frame coupler SFC at its free end coupled to the reel is shown.

Next to the base member of the support frame, a reel handler base RHB with on top of the reel handler base a reel handler RH is provided. The reel handler base may be fixed to a reference structure RS, but may also be moveable relative to the reference structure. The same applies to the support frame, but preferably at least one of the reel handler base and support frame is moveable relative to the reference structure.

The reel handler is configured as a cart and comprises reel engagement members REM that are able to engage with an empty reel. The reel engagement members can be positioned in an extended position and a retracted position. In FIG. 15, the reel engagement members are shown in the retracted position.

Arranged on the reel handler base are first guide elements GE1 along which the reel handler is able to move relative to the reel handler base. The first guide elements, e.g. rails, can be aligned with second guide elements arranged on the base member of the support frame, so that the reel handler is able to move from the reel handler base onto the base member of the support frame below the empty reel R. This is shown in FIG. 16.

Figure 18:
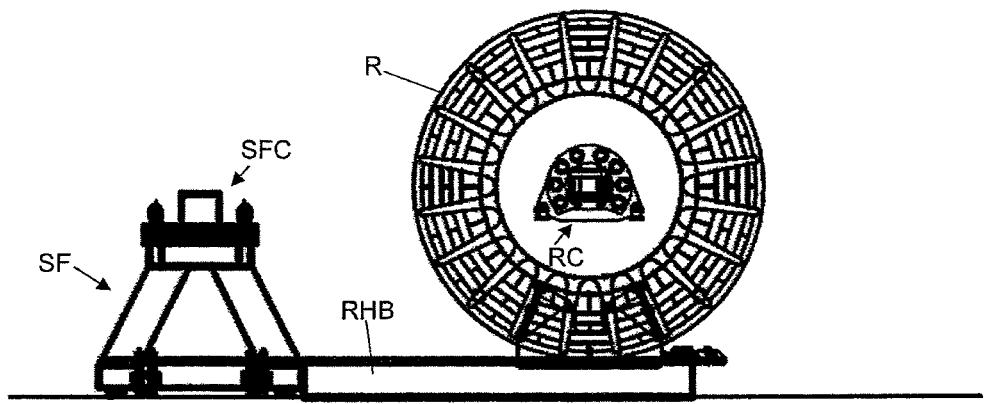

Also shown in FIG. 16 is that the reel engagement members are extended to the extended position. Subsequently, the weight of the empty reel is transferred from the support frame to the reel handler by shortening the first and second arm and thereby lowering the empty reel onto the reel handler. This is shown in FIG. 17. The reel may now be uncoupled (if necessary) from the frame couplers on the support frame and moved horizontally in a direction perpendicular to the rotation axis of the reel by moving the reel handler back to the reel handler base as shown in FIG. 18.

The support frame is now ready to receive a next filled reel, for instance in a similar fashion as shown with reference to FIGS. 6-14.

Figure 19:
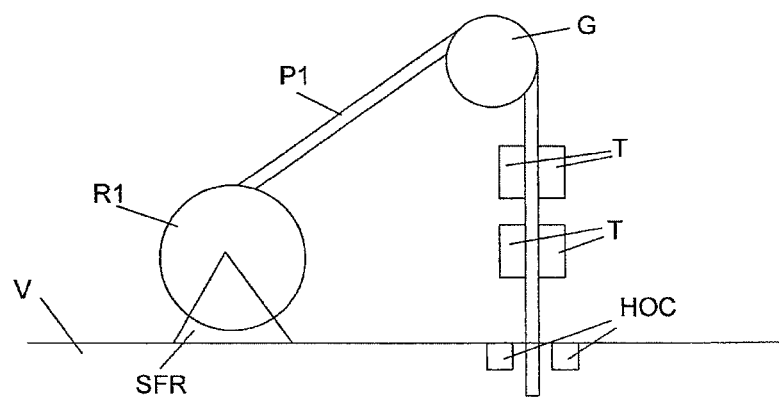

FIG. 19 depicts schematically a portion of a pipelaying vessel V according to an embodiment of the invention. Arranged on the vessel V are a first reel R1 carried by a support frame SFR, a guide wheel G, tensioners T, and a hang off clamp HOC. Not shown, but possibly a straightener may be provided between the guide wheel G and the tensioners.

The first reel stores a length of first pipeline P1 and by unwinding the first pipeline from the first reel, guiding the first pipeline P over the guide wheel and through the tensioners and hang off clamp, the pipeline can be laid towards the bottom of a sea. The hang off clamp can be used to fix the position of the first pipeline relative to the vessel and support the weight of the launched pipeline. The tensioners T can be used to lower the pipeline into the water in a controlled manner.

Figure 20:
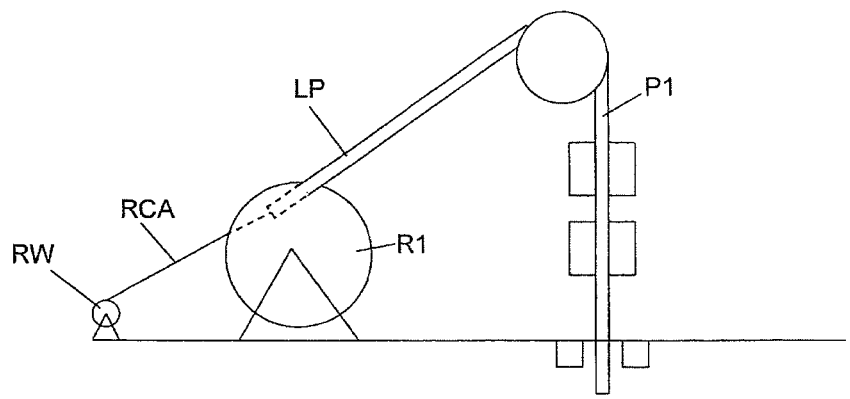

In FIG. 20, the reel has been unwound until an end portion LP of the first pipeline is still connected to the reel R. Connected to the end portion LP of the first pipeline P1 is a retaining cable RCA which is connected with its other end to a retaining winch RW. The retaining winch and cable form part of a retaining system and are able to hold the end portion of the first pipeline. The weight of the first pipeline may be carried by the tensioners and/or the hang off clamp. The latter is preferred. The retaining system therefore only has to control movement of the end portion of the first pipeline and does not have to carry the entire first pipeline.

Figure 21:
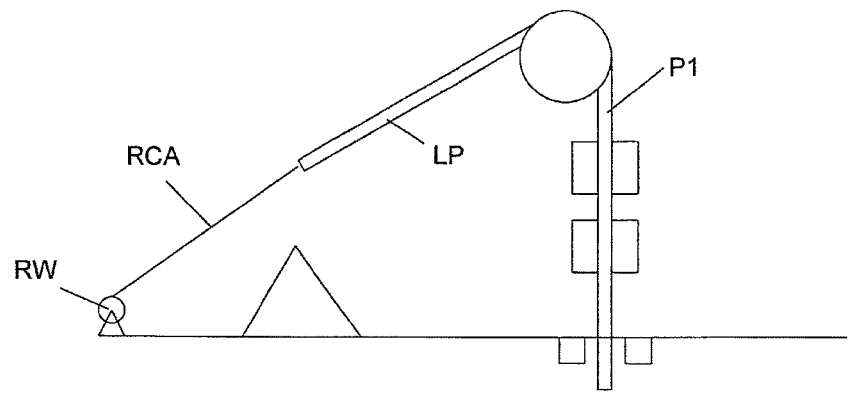

As the end portion of the first pipeline is held by the retaining winch and retaining cable, the end portion can now be safely disconnected from the first reel R1, so that the first reel R1 can be removed from the vessel or be placed somewhere else on the vessel. The situation in which the first reel is removed from the vessel is shown in FIG. 21. By retaining the end portion of the first pipeline by the retaining system, unwanted motions of the end portion can be prevented.

Figure 22:
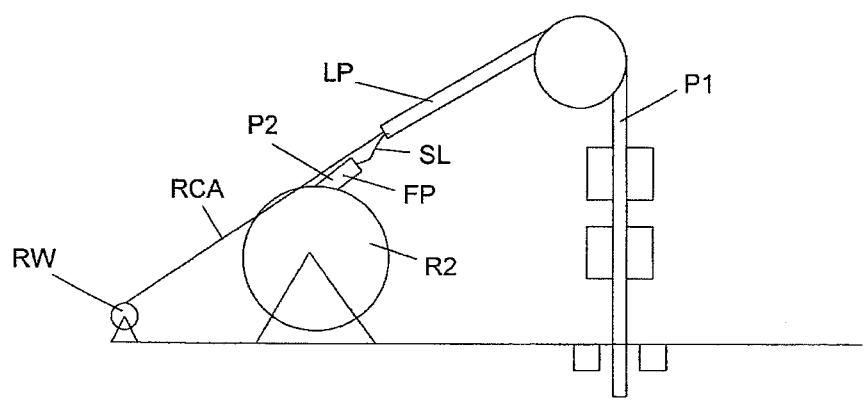

Subsequently, a second reel R2 can be placed on the support frame SFR to replace the first reel R1. An end portion FP of a second pipeline P2 on the second reel is connected to the last portion LP by a sling SL. This is shown in FIG. 22.

Figure 23:
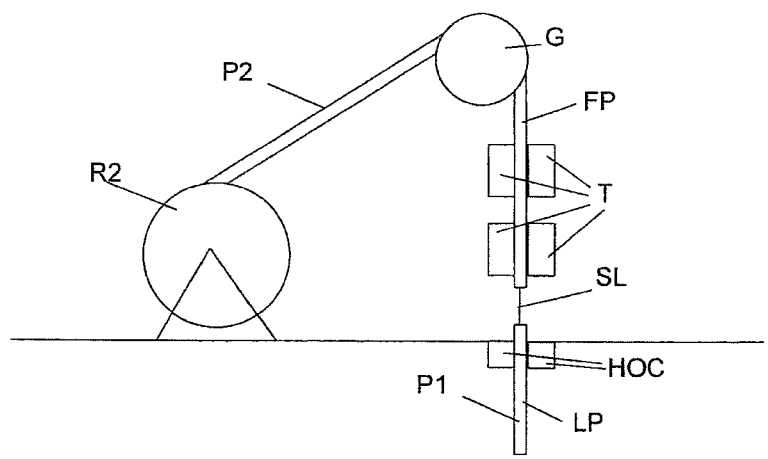

By further lowering the first and second pipeline P1, P2 and unwinding the second pipeline from the second reel, the end portion FP is moved over the guide wheel G and through the tensioners T until the sling is between the tensioners and the hang of clamp as shown in FIG. 23. Before this situation occurs, the retaining system may be disconnected from the last portion as retainment of the end portion of the first pipeline is not necessary anymore. In the situation of FIG. 23, the tensioners hold the end portion FP of the second pipeline and the hang off clamp holds the end portion LP of the first pipeline P1. It is then possible to perform operations on the free ends of both the first and second pipeline, move the second pipeline in the direction of the first portion by the tensioners, remove the sling and connect, e.g. weld, the first pipeline to the second pipeline so that the situation of FIG. 19 is obtained and a single pipeline P is formed that can be laid. This cycle may be repeated until an entire pipeline is laid.

FIG. 24 depicts a retaining system according to an embodiment of the invention. Shown are a second reel R2 with an end portion FP of a second pipeline P2. Also shown is an end portion of a first pipeline P1 unwound from a previous first reel. The free end of the end portion of the first pipeline P1 is retained by a retaining system comprising an intermediate member IM having three cable connections CC,CC1,CC2. One cable connection CC is provided between the intermediate member and the end portion of the first pipeline and the other two cable connections CC1, CC2 are provided between the intermediate member and respective retaining winches RW1,RW2.

The cable connections between the intermediate member and the retaining winches together form a V opening through which a reel can be removed or a reel can be placed as indicated by arrow A.

Also connected to the last portion is a sling SL to be connected to the end portion of the second pipeline P2.

FIG. 25 depicts schematically a rear portion of an upper deck UD of a vessel V in top view. In a corner of the upper deck, a crane CR is provided. In FIG. 25 this is shown by the footprint of the crane CR.

Extending in a direction perpendicular to a longitudinal direction LD of the vessel V are guides G1. Said guides G1 are configured to guide a support frame including reel (not shown). Indicated by dashed lines are three storage positions SPO and one operational position OP. The operational position is the position in which a support frame including reel can be aligned with a pipelaying installation to lay a pipeline from the reel into the sea by the pipelaying installation. As aligning the reel with the pipelaying installation may require adjusting the position of the support frame and the reel in a direction perpendicular to the longitudinal direction of the vessel, the operational position is larger than the storage positions. The storage positions are configured to temporarily store a support frame including reel.

To accommodate all storage positions SPO and the operational position OP, the upper deck UD comprises an extension EX which extends beyond the outer contour of the vessel V.

Support frames including reel (not shown) can be positioned in one of the storage positions SPO by the crane CR. The support frame can subsequently be moved from a storage position to the operational position by a skid drive unit SDU, which in FIG. 25 is depicted in the operational position. The SDU is configured to move along guides G2 extending parallel to the guides G1.

FIG. 26 schematically depicts a side view of a support frame SF including reel R and skid drive unit SDU arranged on the vessel V of FIG. 26. Shown are the guides G1 for the support frame SF and the guides or skid beams G2 for the skid drive unit.

The support frame SF supports the reel R such that reel R is able to rotate about a rotation axis RA. The support frame SF lacks reel drive means and positioning means to move the support frame. As such the weight of the support frame and reel is reduced and the combination of support frame and reel is interchangeable.

The skid drive unit SDU comprises a skid cart SC and arranged on the skid cart connecting means CM to connect the skid cart SC to the support frame SF. In FIG. 26 the connecting means are schematically depicted as pins that are received in corresponding holes of the support frame. By moving the pins in a direction indicated by arrows C, the pins are able to couple with the support frame thereby connecting the skid cart SC to the support frame SF and are able to uncouple thereby disconnecting the skid cart from the support frame. A skilled person will understand that it is envisaged that the connecting means may connect the skid cart to the support frame also in other ways.

The skid drive unit further comprises reel drive means RDM which are pivotable about respective pivot axes PA1, so that the reel drive means RDM are able to move in a direction indicated by arrows D to engage to and disengage from the reel R. In FIG. 26, the reel drive means are shown in a disengaged state. This disengaged state allows the skid drive unit to pass below the reel (provided that the connecting means are also disengaged from the support frame). As a result, the skid drive unit is able to reach every support frame in the storage positions and/or operational position regardless of the fact if intermediate storage positions or operational position are occupied by other support frames.

To move the skid drive unit and possibly a support frame including reel if the skid drive unit is connected to the support frame, the skid drive unit may be provided with skidding means (not shown) operable between the skid cart SC and the guides G2 which in that case act as skid beams. It is also possible to provide separate skid beams.

FIG. 27 depicts schematically in more detail a part of the reel drive means RDM of FIG. 26 in an engaged state.

Shown are a reel flange F of the reel R and arranged on the outer contour of the reel flange F a rack flange RFL having a rack RAC on the outwards facing surface of the rack flange. The reel drive means comprise guide wheels GW1, GW2 which are freely rotatable about respective rotation axes RA1 and RA2. The guide wheels are configured to run on both sides of the rack flange as depicted in FIG. 27. Attached to the rotation axis RA2 is a gear GE configured to cooperate with the rack RAC to drive the reel R.

The guide wheels GW1 and rotation axes RA1 are arranged on beams BE which are pivotable about pivot axes PA2. Pivoting the beams is effected by a hydraulic cylinder HC provided at an opposite side of the beams BE.

In FIG. 28, the hydraulic cylinder HC has contracted such that the beams BE are moved to an open position in which the rack flange RFL is able to pass the guide wheels GW1. By extending the hydraulic cylinder, the beams are able to move back to a closed position as depicted in FIG. 27 in which said guide wheels GW1 engage with the inside surface of the rack flange. Referring to FIG. 28 again, by moving the beams to the open position, the reel drive means can disengage from the reel so that the skid drive unit is able to move to another support frame and couple with this support frame and reel to operate them.

FIG. 29 schematically depicts a vessel V having an upper deck UD and arranged on the upper deck a crane CR. The vessel V further comprises a operational position OP in which a support frame including reel can be positioned to lay a pipeline from said reel. In the operational position, the support frame and reel can be aligned with a pipelaying installation.

Adjacent the operational position at both sides of the vessel VE two storage positions SPO' are shown. Extending in a direction perpendicular to a longitudinal direction LD of the vessel V are guides G1 to guide movement of the support frame between the operational position OP and the adjacent storage positions SPO'. Said movement is performed by a skid drive unit SDU which is moved along guides G2 extending parallel to said guides G1.

When a support frame is positioned in the storage positions SPO' adjacent the operational position, the support frame can be moved to other storage positions SPO, which are placed on a line extending parallel to the longitudinal direction, by a skid drive unit SDU1 or skid drive unit SDU2 depending on which side of the vessel VE the support frame is. The vessel therefore comprises corresponding guides G1' and G2' extending parallel to the longitudinal direction of the vessel. As a result, there are more storage positions than for instance as depicted in FIG. 25, so that more support frames including reels can be carried by the vessel while still being able to position each support frame in the operational position. In FIG. 25 two reels can be supported and handled by the skid drive unit without having to remove reels, while in FIG. 29 it is possible to handle four reels without having to remove reels.

As the reel only has to be rotated in the operational position, the skid drive unit SDU can be provided with reel drive means, e.g. the reel drive means as shown in FIGS. 27-28, whereas the other skid drive units SDU1, SDU2 do not require such reel drive means and only need to be able to move the support frames including reel along the deck.

FIG. 30 discloses an embodiment of the invention in perspective view which is similar to the embodiment of FIG. 29.

Shown are a floating body 12 and arranged on the floating body 12 a crane 14 of which only the lower part is shown. A support frame SF including reel is positioned in a storage position in which the support frame can be moved along corresponding guides in longitudinal direction of the floating body 12 or along guides G1 in a direction perpendicular thereto to move to an operational position.

A skid drive unit SDU is depicted in the operational position. The skid drive unit comprises a skid cart SC and arranged on the skid cart connecting means CM, here depicted as pins that can be received in corresponding holes SF1 of the support frame SF to connect the skid cart SC to the support frame. Further arranged on the skid cart SC are reel drive means RDM, e.g. the reel drive means of FIG. 27-28. Said reel drive means are pivotable about an pivot axis such that the reel drive means are able to move in a direction D to couple with a flange of the reel. By engaging with the flange of the reel, the reel drive means are able to rotate the reel.

To move the skid cart SC over beams G2 hydraulic cylinders HSC are provided, each between a skid beam clamp SKC and the skid cart SC as is known in the art.

What is claimed is:

1. A method for reel-laying pipelines from a vessel comprising a reel support, a guide wheel, tensioners, and a hang off clamp, wherein a first reel with a first pipeline supported by a reel support is replaced by a second reel with a second pipeline, said method comprising the steps of:
    a. reel laying the first pipeline by unwinding the first reel, and guiding the pipeline via the guide wheel through the tensioners and the hang off clamp into the sea;
    b. closing the hang off clamp;
    c. while the launched first pipeline is supported by the hang off clamp, connecting the end portion of the first pipeline which has not yet passed the guide wheel to a retaining system in the vicinity of the first reel;
    d. replacing the first reel by the second reel;
    e. providing a temporary connection between an end portion of the second pipeline and the end portion of the first pipeline while the first pipeline is supported by the retaining system;
    f. disconnecting the first pipeline from the retaining system;
    g. opening the hang off clamp;
    h. continuing reel laying by unwinding the second reel and allowing the second pipeline to pass over the guide wheel and through the tensioners;
    i. closing the hang off clamp;
    j. removing the temporary connection between the first and second pipeline; and
    k. connecting the first and second pipeline end to end between the tensioners and the hang off clamp.

2. The method according to claim 1, wherein the step k. is performed by a welding station provided between the tensioners and the hang-off clamp.

3. The method according to claim 2, wherein the first pipeline is connected to the first reel, and the method further comprises the step of disconnecting the end portion of the first pipeline from the first reel prior to replacing the first reel by the second reel.

4. The method according to claim 2, wherein the retaining system comprises a retaining cable and a retaining winch, wherein the retaining winch is configured to provide a desired hold-back force to hold the end portion of the first pipeline.

5. The method according to claim 1, wherein the first pipeline is connected to the first reel, and the method further comprises the step of disconnecting the end portion of the first pipeline from the first reel prior to replacing the first reel by the second reel.

6. The method according to claim 5, wherein the retaining system comprises a retaining cable and a retaining winch, wherein the retaining winch is configured to provide a desired hold-back force to hold the end portion of the first pipeline.

7. The method according to claim 1, wherein the retaining system comprises a retaining cable and a retaining winch, wherein the retaining winch is configured to provide a desired hold-back force to hold the end portion of the first pipeline.

8. The method according to claim 1, wherein the retaining system comprises two retaining cables and two respective retaining winches, wherein the two retaining cables are connected to the end portion of the first pipeline, and the retaining winches are placed on a deck supporting the reel via a reel support, said retaining system being arranged such that the retaining cables form a V-door or V-shaped opening when connected to the end portion of the first pipeline through which the first reel can be replaced by the second reel.

9. The method according to claim 8, wherein the retaining cables of the retaining system are connected to an intermediate member that is connected by a single cable to the end portion of the first pipeline.

10. The method according to claim 9, wherein the temporary connection between the first and second pipelines comprises a sling, which is provided between the intermediate member and the end portion of the second pipeline, in which case the intermediate member remains connected to the first and second pipelines when the retaining system is disconnected.

11. The method according to claim 9, wherein the temporary connection between the first and second pipelines comprises a sling, and wherein said sling is provided directly between the first and second pipelines, so that disconnecting the retaining system also involves the removal of the intermediate member.

* * * * *